(12) United States Patent
Shattil

(10) Patent No.: US 11,894,965 B2
(45) Date of Patent: **\*Feb. 6, 2024**

(54) EFFICIENT SYNTHESIS AND ANALYSIS OF OFDM AND MIMO-OFDM SIGNALS

(71) Applicant: Tybalt, LLC, Boulder, CO (US)

(72) Inventor: Steve Shattil, Cheyenne, WY (US)

(73) Assignee: Tybalt, LLC, Boulder, CO (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/103,801

(22) Filed: Jan. 31, 2023

(65) Prior Publication Data

US 2023/0179462 A1 Jun. 8, 2023

Related U.S. Application Data

(63) Continuation of application No. 17/517,461, filed on Nov. 2, 2021, now Pat. No. 11,570,029, which is a
(Continued)

(51) Int. Cl.
*H04L 27/26* (2006.01)
*H04B 7/0456* (2017.01)
*H04B 7/024* (2017.01)

(52) U.S. Cl.
CPC ....... *H04L 27/2614* (2013.01); *H04B 7/0456* (2013.01); *H04B 7/0465* (2013.01); *H04L 27/2634* (2013.01); *H04B 7/024* (2013.01)

(58) Field of Classification Search
CPC .............................. H04B 7/04; H04B 7/0456
See application file for complete search history.

(56) References Cited

U.S. PATENT DOCUMENTS

| 4,164,714 A | 8/1979 | Swanson |
| 4,471,399 A | 9/1984 | Udren |

(Continued)

FOREIGN PATENT DOCUMENTS

| CN | 105635025 | 9/2018 |
| CN | 108737307 A | 11/2018 |

(Continued)

OTHER PUBLICATIONS

D.A. Wiegandt, C.R. Nassar; "Higher-Speed, Higher-Performance 802.11a Wireless LAN via Carrier-Interferometry Orthogonal Frequency Division Multiplexing"; 2002 IEEE International Conference on Communications. Conference Proceedings. ICC 2002 (Cat. No. 02CH37333). Apr. 28-May 2, 2002.
(Continued)

*Primary Examiner* — Kevin Kim
(74) *Attorney, Agent, or Firm* — Steven J Shattil

(57) ABSTRACT

A Multiple Input Multiple Output (MIMO) system in a radio access network (RAN) comprises a virtualized baseband unit, an antenna array; and a fronthaul network that connects the virtualized baseband unit to the antenna array. For a first set of antennas in the antenna array, the virtualized baseband unit generates a first MIMO matrix from channel state information (CSI); computes a sparse update matrix corresponding to an update to the first set of antennas; sums the sparse update matrix with the first MIMO matrix to produce a second MIMO matrix corresponding to a second set of antennas in the antenna array; determines which of the MIMO matrices results in a better CSI, MIMO condition number, peak-to-average-power ratio, or quality metric of spatial subchannels; and based on the determination, selects the first set of antennas or the second set of antennas to transmit or receive signals in the RAN.

20 Claims, 12 Drawing Sheets

Related U.S. Application Data continuation of application No. 17/234,519, filed on Apr. 19, 2021, now Pat. No. 11,196,603, which is a continuation of application No. 16/932,753, filed on Jul. 18, 2020, now Pat. No. 10,985,961, which is a continuation of application No. 16/709,093, filed on Dec. 10, 2019, now Pat. No. 10,728,074, which is a continuation of application No. 16/364,734, filed on Mar. 26, 2019, now Pat. No. 10,505,774, which is a continuation of application No. 16/021,001, filed on Jun. 27, 2018, now Pat. No. 10,243,773, said application No. 18/103,801 is a continuation-in-part of application No. 17/245,297, filed on Apr. 30, 2021, now Pat. No. 11,700,162, which is a continuation of application No. 16/779,657, filed on Feb. 20, 2020, now Pat. No. 11,018,918, which is a continuation of application No. 15/988,898, filed on May 24, 2018, now Pat. No. 10,637,705.

(60) Provisional application No. 62/536,955, filed on Jul. 25, 2017, provisional application No. 62/527,603, filed on Jun. 30, 2017, provisional application No. 62/510,987, filed on May 25, 2017.

(56) References Cited

U.S. PATENT DOCUMENTS

| | | |
|---|---|---|
| 4,479,226 A | 10/1984 | Prabhu et al. |
| 4,550,402 A | 10/1985 | Gable et al. |
| 4,590,511 A | 5/1986 | Bocchi et al. |
| 4,628,517 A | 12/1986 | Schwarz |
| 4,700,341 A | 10/1987 | Huang |
| 4,827,480 A | 5/1989 | Kowalski |
| 4,901,307 A | 2/1990 | Gilhousen et al. |
| 4,912,422 A | 3/1990 | Kobayashi et al. |
| 4,943,973 A | 7/1990 | Werner |
| 5,003,545 A | 3/1991 | Kowalski |
| 5,016,242 A | 5/1991 | Tang |
| 5,093,863 A | 3/1992 | Galand et al. |
| 5,125,100 A | 6/1992 | Katznelson |
| 5,191,459 A | 3/1993 | Thompson et al. |
| 5,249,201 A | 9/1993 | Posner et al. |
| 5,282,222 A | 1/1994 | Fattouche et al. |
| 5,309,514 A | 5/1994 | Johnson et al. |
| 5,406,551 A | 4/1995 | Saito et al. |
| 5,410,538 A | 4/1995 | Roche et al. |
| 5,412,648 A | 5/1995 | Fan |
| 5,422,952 A | 6/1995 | Kennedy et al. |
| 5,425,049 A | 6/1995 | Dent et al. |
| 5,457,557 A | 10/1995 | Zarem et al. |
| 5,463,376 A | 10/1995 | Stoffer |
| 5,491,727 A | 2/1996 | Petit |
| 5,500,856 A | 3/1996 | Nagase et al. |
| 5,504,775 A | 4/1996 | Chouly et al. |
| 5,504,783 A | 4/1996 | Tomisato et al. |
| 5,519,692 A | 5/1996 | Hershey |
| 5,521,937 A | 5/1996 | Kondo et al. |
| 5,528,581 A | 6/1996 | De Bot |
| 5,533,012 A | 7/1996 | Fukasawa et al. |
| 5,543,806 A | 8/1996 | Wilkinson |
| 5,548,582 A | 8/1996 | Brajal et al. |
| 5,555,268 A | 9/1996 | Fattouche et al. |
| 5,563,906 A | 10/1996 | Hershey et al. |
| 5,579,304 A | 11/1996 | Sugimoto et al. |
| 5,612,978 A | 3/1997 | Blanchard et al. |
| 5,630,154 A | 5/1997 | Bolstad et al. |
| 5,640,698 A | 6/1997 | Shen et al. |
| 5,691,832 A | 11/1997 | Liedenbaum et al. |
| 5,694,393 A | 12/1997 | Kaye |
| 5,704,013 A | 12/1997 | Watari et al. |
| 5,712,716 A | 1/1998 | Vanoli et al. |
| 5,765,097 A | 6/1998 | Dail |
| 5,790,516 A | 8/1998 | Gudmundson et al. |
| 5,793,413 A | 8/1998 | Hylton et al. |
| 5,793,759 A | 8/1998 | Rakib et al. |
| 5,809,426 A | 9/1998 | Radojevic et al. |
| 5,815,801 A | 9/1998 | Hamalainen et al. |
| 5,818,619 A | 10/1998 | Medved et al. |
| 5,822,368 A | 10/1998 | Wang |
| 5,828,658 A | 10/1998 | Ottersten et al. |
| 5,831,977 A | 11/1998 | Dent |
| 5,838,268 A | 11/1998 | Frenkel et al. |
| 5,844,951 A | 12/1998 | Proakis et al. |
| 5,862,189 A | 1/1999 | Huisken et al. |
| 5,931,893 A | 8/1999 | Dent et al. |
| 5,940,196 A | 8/1999 | Piehler et al. |
| 5,940,379 A | 8/1999 | Startup et al. |
| 5,943,322 A | 8/1999 | Mayor et al. |
| 5,943,332 A | 8/1999 | Liu et al. |
| 5,949,796 A | 9/1999 | Kumar |
| 5,955,983 A | 9/1999 | Li |
| 5,955,992 A | 9/1999 | Shattil |
| 5,960,032 A | 9/1999 | Letaief et al. |
| 5,991,334 A | 11/1999 | Papadopoulos et al. |
| 6,008,760 A | 12/1999 | Shattil |
| 6,018,317 A | 1/2000 | Dogan et al. |
| 6,047,190 A | 4/2000 | Haleem et al. |
| 6,055,432 A | 4/2000 | Haleem et al. |
| 6,058,105 A | 5/2000 | Hochwald |
| 6,075,812 A | 6/2000 | Cafarella et al. |
| 6,084,871 A | 7/2000 | Engstrom et al. |
| 6,088,351 A | 7/2000 | Jenkin et al. |
| 6,091,967 A | 7/2000 | Kruys et al. |
| 6,097,712 A | 8/2000 | Secord et al. |
| 6,097,773 A | 8/2000 | Carter et al. |
| 6,107,954 A | 8/2000 | Li |
| 6,122,295 A | 9/2000 | Kato et al. |
| 6,128,276 A | 10/2000 | Agee |
| 6,128,350 A | 10/2000 | Shastri et al. |
| 6,130,918 A | 10/2000 | Humphrey et al. |
| 6,141,393 A | 10/2000 | Thomas et al. |
| RE36,944 E | 11/2000 | Li |
| 6,144,711 A | 11/2000 | Raleigh et al. |
| 6,154,443 A | 11/2000 | Huang et al. |
| 6,155,980 A | 12/2000 | Chiao et al. |
| 6,175,550 B1 | 1/2001 | van Nee et al. |
| 6,175,551 B1 | 1/2001 | Awater et al. |
| 6,178,158 B1 | 1/2001 | Suzuki et al. |
| 6,188,717 B1 | 2/2001 | Kaiser et al. |
| 6,192,068 B1 | 2/2001 | Fattouche et al. |
| 6,208,295 B1 | 3/2001 | Dogan et al. |
| 6,211,671 B1 | 4/2001 | Shattil |
| 6,215,983 B1 | 4/2001 | Dogan et al. |
| 6,233,248 B1 | 5/2001 | Sautter et al. |
| 6,236,642 B1 | 5/2001 | Shaffer et al. |
| 6,240,129 B1 | 5/2001 | Reusens et al. |
| 6,243,565 B1 | 6/2001 | Smith et al. |
| 6,243,581 B1 | 6/2001 | Jawanda |
| 6,252,909 B1 | 6/2001 | Tzannes et al. |
| 6,266,702 B1 | 7/2001 | Darnell et al. |
| 6,282,167 B1 | 8/2001 | Michon et al. |
| 6,282,185 B1 | 8/2001 | Hakkinen et al. |
| 6,289,220 B1 | 9/2001 | Spear |
| 6,292,473 B1 | 9/2001 | Duske et al. |
| 6,301,221 B1 | 10/2001 | Paterson |
| 6,307,892 B1 | 10/2001 | Jones et al. |
| 6,310,704 B1 | 10/2001 | Dogan et al. |
| 6,320,897 B1 | 11/2001 | Fattouche et al. |
| 6,331,837 B1 | 12/2001 | Shattil |
| 6,348,791 B2 | 2/2002 | Shattil |
| 6,351,499 B1 | 2/2002 | Paulraj et al. |
| 6,359,923 B1 | 3/2002 | Agee et al. |
| 6,377,566 B1 | 4/2002 | Cupo et al. |
| 6,389,034 B1 | 5/2002 | Guo et al. |
| 6,405,147 B1 | 6/2002 | Fera |
| 6,418,136 B1 | 7/2002 | Naor et al. |
| 6,421,528 B1 | 7/2002 | Rosen et al. |
| 6,434,390 B2 | 8/2002 | Rahman |
| 6,438,173 B1 | 8/2002 | Stantchev et al. |
| 6,442,130 B1 | 8/2002 | Jones, IV et al. |
| 6,442,193 B1 | 8/2002 | Hirsch |
| 6,442,222 B1 | 8/2002 | Ghazi-Moghadam et al. |

(56) References Cited

U.S. PATENT DOCUMENTS

| | | |
|---|---|---|
| 6,452,981 B1 | 9/2002 | Raleigh et al. |
| 6,459,740 B1 | 10/2002 | Lo |
| 6,463,295 B1 | 10/2002 | Yun |
| 6,470,055 B1 | 10/2002 | Feher |
| 6,473,393 B1 | 10/2002 | Ariyavisitakul et al. |
| 6,473,418 B1 | 10/2002 | Laroia et al. |
| 6,496,290 B1 | 12/2002 | Lee |
| 6,504,862 B1 | 1/2003 | Yang et al. |
| 6,507,319 B2 | 1/2003 | Sikina |
| 6,510,133 B1 | 1/2003 | Uesugi |
| 6,512,737 B1 | 1/2003 | Agee |
| 6,526,105 B1 | 2/2003 | Harikumar et al. |
| 6,532,224 B1 | 3/2003 | Dailey |
| 6,549,581 B1 | 4/2003 | Izumi et al. |
| 6,563,881 B1 | 5/2003 | Sakoda et al. |
| 6,567,482 B1 | 5/2003 | Popovic |
| 6,567,982 B1 | 5/2003 | Howe et al. |
| 6,570,913 B1 | 5/2003 | Chen |
| 6,600,776 B1 | 7/2003 | Alamouti et al. |
| 6,603,827 B2 | 8/2003 | Bottomley et al. |
| 6,606,351 B1 | 8/2003 | Dapper et al. |
| 6,631,175 B2 | 10/2003 | Harikumar et al. |
| 6,636,495 B1 | 10/2003 | Tangemann |
| 6,650,645 B2 | 11/2003 | Scott et al. |
| 6,654,408 B1 | 11/2003 | Kadous et al. |
| 6,654,719 B1 | 11/2003 | Papadias |
| 6,662,024 B2 | 12/2003 | Walton et al. |
| 6,665,348 B1 | 12/2003 | Feher |
| 6,665,521 B1 | 12/2003 | Gorday et al. |
| 6,667,714 B1 | 12/2003 | Solondz |
| 6,674,810 B1 | 1/2004 | Cheng |
| 6,674,999 B2 | 1/2004 | Ramachandran |
| 6,678,318 B1 | 1/2004 | Lai |
| 6,686,879 B2 | 2/2004 | Shattil |
| 6,687,511 B2 | 2/2004 | McGowan et al. |
| 6,693,984 B1 | 2/2004 | Andre et al. |
| 6,694,154 B1 | 2/2004 | Molnar et al. |
| 6,704,794 B1 | 3/2004 | Kejriwal et al. |
| 6,717,908 B2 | 4/2004 | Vijayan et al. |
| 6,728,295 B1 | 4/2004 | Nallanathan et al. |
| 6,747,946 B1 | 6/2004 | Kaneko et al. |
| 6,751,187 B2 | 6/2004 | Walton et al. |
| 6,757,344 B2 | 6/2004 | Carleton et al. |
| 6,760,373 B2 | 7/2004 | Gross et al. |
| 6,765,969 B1 | 7/2004 | Vook et al. |
| 6,778,514 B1 | 8/2004 | Boccussi et al. |
| 6,785,513 B1 | 8/2004 | Sivaprakasam |
| 6,813,485 B2 | 11/2004 | Sorrells et al. |
| 6,832,251 B1 | 12/2004 | Gelvin et al. |
| 6,850,481 B2 | 2/2005 | Wu et al. |
| 6,859,506 B1 | 2/2005 | McCorkle |
| 6,859,641 B2 | 2/2005 | Collins et al. |
| 6,882,619 B1 | 4/2005 | Gerakoulis |
| 6,901,422 B1 | 5/2005 | Sazegari |
| 6,907,270 B1 | 6/2005 | Blanz |
| 6,928,047 B1 | 8/2005 | Xia |
| 6,944,168 B2 | 9/2005 | Paatela et al. |
| 6,975,666 B2 | 12/2005 | Affes et al. |
| 6,980,768 B2 | 12/2005 | Arend et al. |
| 6,982,968 B1 | 1/2006 | Barratt et al. |
| 6,985,533 B2 | 1/2006 | Attallah et al. |
| 6,996,076 B1 | 2/2006 | Forbes et al. |
| 7,009,958 B1 | 3/2006 | Gerakoulis |
| 7,010,015 B2 | 3/2006 | Hervey |
| 7,010,048 B1 | 3/2006 | Shattil |
| 7,020,110 B2 | 3/2006 | Walton et al. |
| 7,031,309 B1 | 4/2006 | Sautter et al. |
| 7,031,371 B1 | 4/2006 | Lakkis |
| 7,035,661 B1 | 4/2006 | Yun |
| 7,057,555 B2 | 6/2006 | Lewis |
| 7,075,999 B2 | 7/2006 | Redfern |
| 7,076,168 B1 | 7/2006 | Shattil |
| 7,082,153 B2 | 7/2006 | Balachandran et al. |
| 7,099,268 B2 | 8/2006 | Ichihara et al. |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,474 B1 | 1/2007 | Gerakoulis |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,224,716 B2 | 5/2007 | Roman |
| 7,263,133 B1 | 8/2007 | Miao |
| 7,283,799 B2 | 10/2007 | Shattil |
| 7,286,604 B2 | 10/2007 | Shattil |
| 7,295,509 B2 | 11/2007 | Laroia et al. |
| 7,304,939 B2 | 12/2007 | Steer et al. |
| 7,317,750 B2 | 1/2008 | Shattil |
| 7,366,117 B2 | 4/2008 | Kim et al. |
| 7,376,074 B2 | 5/2008 | Jung et al. |
| 7,391,804 B2 | 6/2008 | Shattil |
| 7,406,261 B2 | 7/2008 | Shattil |
| 7,418,043 B2 | 8/2008 | Shattil |
| 7,426,196 B2 | 9/2008 | Gopalakrishnan et al. |
| 7,430,257 B1 | 9/2008 | Shattil |
| 7,469,013 B1 | 12/2008 | Bolt et al. |
| 7,505,788 B1 | 3/2009 | Narasimhan |
| 7,508,798 B2 | 3/2009 | Tong et al. |
| 7,570,956 B2 | 8/2009 | Bigham et al. |
| 7,594,010 B2 | 9/2009 | Dohler et al. |
| 7,606,137 B2 | 10/2009 | Shattil |
| 7,751,488 B2 | 7/2010 | Moffatt |
| 7,764,594 B2 | 7/2010 | Walton et al. |
| 7,787,514 B2 | 8/2010 | Shattil |
| 7,787,556 B2 | 8/2010 | Zhang et al. |
| 7,801,247 B2 | 9/2010 | Onggosanusi et al. |
| 7,876,729 B1 | 1/2011 | Grilli et al. |
| 7,907,588 B2 | 3/2011 | Schaepperle et al. |
| 8,031,583 B2 | 10/2011 | Classon et al. |
| 8,090,000 B2 | 1/2012 | Hamamura |
| 8,090,037 B1 | 1/2012 | Harris et al. |
| 8,102,907 B2 | 1/2012 | Kim |
| 8,107,965 B2 | 1/2012 | Hui et al. |
| 8,149,969 B2 | 4/2012 | Khan et al. |
| 8,160,166 B2 | 4/2012 | Moffatt et al. |
| 8,301,139 B2 | 10/2012 | Lotze et al. |
| 8,320,301 B2 | 11/2012 | Walton et al. |
| 8,345,693 B1 | 1/2013 | Kim |
| 8,363,739 B2 | 1/2013 | Ma et al. |
| 8,374,074 B2 | 2/2013 | Liao et al. |
| 8,391,913 B2 | 3/2013 | Zimmer et al. |
| 8,396,153 B1 | 3/2013 | Shen et al. |
| 8,401,095 B2 | 3/2013 | Han et al. |
| 8,416,837 B2 | 4/2013 | Wu et al. |
| 8,472,335 B2 | 6/2013 | De Pasquale et al. |
| 8,498,647 B2 | 7/2013 | Gorokhov et al. |
| 8,526,400 B2 | 9/2013 | Tong et al. |
| 8,588,803 B2 | 11/2013 | Hakola et al. |
| 8,649,364 B2 | 2/2014 | Myung |
| 8,654,871 B2 | 2/2014 | Kishigami et al. |
| 8,670,390 B2 | 3/2014 | Shattil |
| 8,677,050 B2 | 3/2014 | Chen et al. |
| 8,724,721 B2 | 5/2014 | Soler Garrido |
| 8,780,830 B2 | 7/2014 | Doppler et al. |
| 8,804,647 B2 | 8/2014 | Ko et al. |
| 8,885,628 B2 | 10/2014 | Palanki et al. |
| 8,929,550 B2 | 1/2015 | Shattil |
| 8,942,082 B2 | 1/2015 | Shattil |
| 8,976,838 B2 | 3/2015 | Jaeckel et al. |
| 9,025,684 B2 | 5/2015 | Jeong et al. |
| 9,026,790 B2 | 5/2015 | Bolton et al. |
| 9,042,468 B2 | 5/2015 | Barbu et al. |
| 9,130,810 B2 | 9/2015 | Laroia et al. |
| 9,225,471 B2 | 12/2015 | Shattil |
| 9,485,063 B2 | 11/2016 | Shattil |
| 9,628,231 B2 | 4/2017 | Shattil |
| 9,693,339 B2 | 6/2017 | Palanki et al. |
| 9,698,888 B2 | 7/2017 | Ko et al. |
| 9,768,842 B2 | 9/2017 | Shattil |
| 9,798,329 B2 | 10/2017 | Shattil |
| 9,800,448 B1 | 10/2017 | Shattil |
| 9,819,449 B2 | 11/2017 | Shattil |
| 9,870,341 B2 | 1/2018 | Badin et al. |

(56) References Cited

U.S. PATENT DOCUMENTS

| | | |
|---|---|---|
| 10,094,650 B2 | 10/2018 | Todeschini |
| 10,211,892 B2 | 2/2019 | Shattil |
| 10,243,773 B1 | 3/2019 | Shattil |
| 10,447,520 B1 | 10/2019 | Shattil |
| 10,505,774 B1 | 12/2019 | Shattil |
| 10,554,353 B2 | 2/2020 | Zhao et al. |
| 10,568,143 B2 | 2/2020 | Delfeld et al. |
| 10,602,507 B2 | 3/2020 | Nammi et al. |
| 10,637,705 B1 | 4/2020 | Shattil |
| 10,728,074 B1 | 7/2020 | Shattil |
| 10,917,167 B2 | 2/2021 | Jia et al. |
| 10,985,961 B1 | 4/2021 | Shattil |
| 10,992,998 B2 | 4/2021 | Bergstrom |
| 11,018,918 B1 | 5/2021 | Shattil |
| 11,025,377 B2 | 6/2021 | Rakib et al. |
| 11,025,471 B2 | 6/2021 | Kuchi |
| 11,075,786 B1 | 7/2021 | Shattil |
| 11,196,603 B2 | 12/2021 | Shattil |
| 11,223,508 B1 | 1/2022 | Shattil |
| 11,252,006 B1 | 2/2022 | Shattil |
| 2001/0050926 A1 | 12/2001 | Kumar |
| 2002/0009096 A1 | 1/2002 | Odenwalder |
| 2002/0034191 A1 | 3/2002 | Shattil |
| 2002/0044524 A1 | 4/2002 | Laroia et al. |
| 2002/0051433 A1 | 5/2002 | Affes et al. |
| 2002/0061068 A1 | 5/2002 | Leva et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0168016 A1 | 11/2002 | Wang et al. |
| 2002/0172184 A1 | 11/2002 | Kim et al. |
| 2002/0172213 A1 | 11/2002 | Laroia et al. |
| 2002/0181509 A1 | 12/2002 | Mody et al. |
| 2002/0193146 A1 | 12/2002 | Wallace et al. |
| 2002/0196733 A1 | 12/2002 | Shen et al. |
| 2003/0026222 A1 | 2/2003 | Kotzin |
| 2003/0043732 A1 | 3/2003 | Walton et al. |
| 2003/0072380 A1 | 4/2003 | Huang |
| 2003/0085832 A1 | 5/2003 | Yu et al. |
| 2003/0086363 A1 | 5/2003 | Hernandes |
| 2003/0128658 A1 | 7/2003 | Walton et al. |
| 2003/0133469 A1 | 7/2003 | Brockmann et al. |
| 2003/0147655 A1 | 8/2003 | Shattil |
| 2003/0154262 A1 | 8/2003 | Kaiser et al. |
| 2003/0161282 A1 | 8/2003 | Medvedev et al. |
| 2003/0169824 A1 | 9/2003 | Chayat |
| 2003/0206527 A1 | 11/2003 | Yim |
| 2003/0218973 A1 | 11/2003 | Oprea et al. |
| 2004/0013101 A1 | 1/2004 | Akin et al. |
| 2004/0017824 A1 | 1/2004 | Koenck |
| 2004/0022175 A1 | 2/2004 | Bolinth et al. |
| 2004/0047405 A1 | 3/2004 | Boesel et al. |
| 2004/0057501 A1 | 3/2004 | Balachandran et al. |
| 2004/0086027 A1 | 5/2004 | Shattil |
| 2004/0100897 A1 | 5/2004 | Shattil |
| 2004/0131011 A1 | 7/2004 | Sandell et al. |
| 2004/0141548 A1 | 7/2004 | Shattil |
| 2004/0151109 A1 | 8/2004 | Batra et al. |
| 2004/0178954 A1 | 9/2004 | Vook et al. |
| 2004/0184398 A1 | 9/2004 | Walton et al. |
| 2004/0223476 A1 | 11/2004 | Jose et al. |
| 2004/0240535 A1 | 12/2004 | Verma et al. |
| 2004/0243258 A1 | 12/2004 | Shattil |
| 2005/0058098 A1 | 3/2005 | Klein et al. |
| 2005/0075081 A1 | 4/2005 | Catreux-Erceg et al. |
| 2005/0078742 A1 | 4/2005 | Cairns et al. |
| 2005/0143037 A1 | 6/2005 | Stratis et al. |
| 2005/0179607 A1 | 8/2005 | Gorsuch et al. |
| 2005/0198199 A1 | 9/2005 | Dowling |
| 2005/0255808 A1 | 11/2005 | Ahmed et al. |
| 2005/0259627 A1 | 11/2005 | Song et al. |
| 2005/0265275 A1 | 12/2005 | Howard et al. |
| 2005/0265293 A1 | 12/2005 | Ro et al. |
| 2005/0270968 A1 | 12/2005 | Feng et al. |
| 2005/0286476 A1 | 12/2005 | Crosswy et al. |
| 2006/0023803 A1 | 2/2006 | Perlman et al. |
| 2006/0034378 A1 | 2/2006 | Lindskog et al. |
| 2006/0057958 A1 | 3/2006 | Ngo et al. |
| 2006/0106600 A1 | 5/2006 | Bessette |
| 2006/0153283 A1 | 7/2006 | Scharf et al. |
| 2006/0245346 A1 | 11/2006 | Bar-Ness et al. |
| 2006/0262870 A1 | 11/2006 | Khan |
| 2007/0004465 A1 | 1/2007 | Papasakellariou et al. |
| 2007/0041311 A1 | 2/2007 | Baum et al. |
| 2007/0041404 A1 | 2/2007 | Palanki et al. |
| 2007/0071125 A1 | 3/2007 | Tan et al. |
| 2007/0081580 A1 | 4/2007 | Breiling |
| 2007/0078924 A1 | 5/2007 | Hassan et al. |
| 2007/0098099 A1 | 5/2007 | Gore et al. |
| 2007/0110172 A1 | 5/2007 | Faulkner et al. |
| 2007/0140102 A1 | 6/2007 | Oh et al. |
| 2007/0160014 A1 | 7/2007 | Larsson |
| 2007/0165845 A1 | 7/2007 | Ye et al. |
| 2007/0177681 A1 | 8/2007 | Choi et al. |
| 2007/0177689 A1 | 8/2007 | Beadle et al. |
| 2007/0183386 A1 | 8/2007 | Muharemovic et al. |
| 2007/0206686 A1 | 9/2007 | Vook et al. |
| 2007/0211807 A1 | 9/2007 | Han et al. |
| 2007/0218942 A1 | 9/2007 | Khan et al. |
| 2008/0075188 A1 | 3/2008 | Kowalski et al. |
| 2008/0090572 A1 | 4/2008 | Cha et al. |
| 2008/0095121 A1 | 4/2008 | Shattil |
| 2008/0151743 A1 | 6/2008 | Tong et al. |
| 2008/0240022 A1 | 10/2008 | Yoon et al. |
| 2008/0298335 A1 | 12/2008 | Lee |
| 2008/0298502 A1 | 12/2008 | Xu et al. |
| 2008/0310484 A1 | 12/2008 | Shattil |
| 2008/0317172 A1 | 12/2008 | Zhang et al. |
| 2009/0005094 A1 | 1/2009 | Lee et al. |
| 2009/0019165 A1 | 1/2009 | Li et al. |
| 2009/0074093 A1 | 3/2009 | Han et al. |
| 2009/0086848 A1 | 4/2009 | Han et al. |
| 2009/0092182 A1 | 4/2009 | Shin et al. |
| 2009/0110033 A1 | 4/2009 | Shattil |
| 2009/0112551 A1 | 4/2009 | Hollis |
| 2009/0147870 A1 | 6/2009 | Lin et al. |
| 2009/0156252 A1 | 6/2009 | Harris |
| 2009/0316643 A1 | 9/2009 | Yamada et al. |
| 2009/0274103 A1 | 11/2009 | Yang et al. |
| 2009/0304108 A1 | 12/2009 | Kwon et al. |
| 2010/0008432 A1 | 1/2010 | Kim et al. |
| 2010/0039928 A1 | 2/2010 | Noh et al. |
| 2010/0041350 A1 | 2/2010 | Zhang et al. |
| 2010/0056200 A1 | 3/2010 | Tolonen |
| 2010/0080112 A1 | 4/2010 | Bertrand et al. |
| 2010/0091919 A1 | 4/2010 | Xu et al. |
| 2010/0098042 A1 | 4/2010 | Dent |
| 2010/0110875 A1 | 5/2010 | No et al. |
| 2010/0165829 A1 | 7/2010 | Narasimha et al. |
| 2010/0184369 A1 | 7/2010 | Cho et al. |
| 2010/0185541 A1 | 7/2010 | Hassan et al. |
| 2010/0232525 A1 | 9/2010 | Xia et al. |
| 2010/0238873 A1 | 9/2010 | Asanuma |
| 2010/0248739 A1 | 9/2010 | Westerberg et al. |
| 2010/0254484 A1 | 10/2010 | Hamaguchi et al. |
| 2010/0254497 A1 | 10/2010 | To et al. |
| 2010/0317343 A1 | 12/2010 | Krishnamurthy et al. |
| 2011/0012798 A1 | 1/2011 | Triolo |
| 2011/0041021 A1 | 2/2011 | Khoshnevis et al. |
| 2011/0058471 A1 | 3/2011 | Zhang |
| 2011/0064156 A1 | 3/2011 | Kim et al. |
| 2011/0096658 A1 | 4/2011 | Yang et al. |
| 2011/0105051 A1 | 5/2011 | Thomas et al. |
| 2011/0107174 A1 | 5/2011 | Liu et al. |
| 2011/0122930 A1 | 5/2011 | Al-Naffouri et al. |
| 2011/0135016 A1 | 6/2011 | Ahn et al. |
| 2011/0150325 A1 | 6/2011 | Hill et al. |
| 2011/0206207 A1 | 8/2011 | Priotti |
| 2011/0228863 A1 | 9/2011 | Papasakellariou et al. |
| 2011/0228878 A1 | 9/2011 | Sorrentino |
| 2011/0281534 A1 | 11/2011 | Liao et al. |
| 2012/0014392 A1 | 1/2012 | Bhushan et al. |
| 2012/0057660 A1 | 3/2012 | Nguyen et al. |

(56) References Cited

U.S. PATENT DOCUMENTS

| | | |
|---|---|---|
| 2012/0087393 A1 | 4/2012 | Jeong et al. |
| 2012/0093200 A1 | 4/2012 | Kyeong |
| 2012/0106504 A1 | 5/2012 | Klatt et al. |
| 2012/0113816 A1 | 5/2012 | Bhattad et al. |
| 2012/0177140 A1 | 7/2012 | Sahara |
| 2012/0188994 A1 | 7/2012 | Palanki et al. |
| 2012/0213054 A1 | 8/2012 | Hamaguchi et al. |
| 2012/0224517 A1 | 9/2012 | Yun et al. |
| 2012/0250740 A1 | 10/2012 | Ling |
| 2012/0252387 A1 | 10/2012 | Haskins et al. |
| 2012/0269285 A1 | 10/2012 | Jeong et al. |
| 2012/0294346 A1 | 11/2012 | Kolze |
| 2013/0012144 A1 | 1/2013 | Besoli et al. |
| 2013/0058239 A1 | 3/2013 | Wang et al. |
| 2013/0058432 A1 | 3/2013 | Futatsugi et al. |
| 2013/0077508 A1 | 3/2013 | Axmon et al. |
| 2013/0142275 A1 | 6/2013 | Baik et al. |
| 2013/0198590 A1 | 8/2013 | Kim et al. |
| 2013/0223269 A1 | 8/2013 | To et al. |
| 2013/0259113 A1 | 10/2013 | Kumar |
| 2013/0315211 A1 | 11/2013 | Balan et al. |
| 2014/0038657 A1 | 2/2014 | Jo et al. |
| 2014/0064392 A1 | 3/2014 | Jonsson et al. |
| 2014/0086186 A1 | 3/2014 | Hamaguchi et al. |
| 2014/0198863 A1 | 7/2014 | Terry |
| 2014/0348253 A1 | 11/2014 | Mobasher et al. |
| 2014/0376652 A1 * | 12/2014 | Sayana ............... H04B 7/0456 375/267 |
| 2015/0009971 A1 | 1/2015 | Han et al. |
| 2015/0049713 A1 | 2/2015 | Lan et al. |
| 2015/0103723 A1 | 4/2015 | Kim et al. |
| 2015/0110216 A1 | 4/2015 | Bajcsy et al. |
| 2015/0117558 A1 | 4/2015 | Phillips |
| 2015/0124765 A1 | 5/2015 | Rong et al. |
| 2015/0195840 A1 | 7/2015 | Ahn et al. |
| 2015/0199963 A1 | 7/2015 | Maaninen |
| 2015/0227747 A1 | 8/2015 | Gassi |
| 2015/0234033 A1 | 8/2015 | Jamieson et al. |
| 2015/0271000 A1 | 9/2015 | Yang et al. |
| 2015/0304153 A1 | 10/2015 | Moffatt et al. |
| 2015/0358190 A1 | 12/2015 | Kruglick et al. |
| 2016/0006594 A1 | 1/2016 | Persson et al. |
| 2016/0050096 A1 | 2/2016 | DelMarco |
| 2016/0050099 A1 | 2/2016 | Siohan et al. |
| 2016/0142117 A1 | 5/2016 | Rahman et al. |
| 2016/0197756 A1 | 7/2016 | Mestdagh et al. |
| 2016/0198474 A1 | 7/2016 | Raghavan et al. |
| 2016/0248443 A1 | 8/2016 | Murakami et al. |
| 2016/0254889 A1 | 9/2016 | Shattil |
| 2016/0269083 A1 | 9/2016 | Porat et al. |
| 2016/0344497 A1 | 11/2016 | Myung et al. |
| 2016/0352012 A1 | 12/2016 | Foo |
| 2016/0353446 A1 | 12/2016 | Abdoli et al. |
| 2017/0019284 A1 | 1/2017 | Ankarali et al. |
| 2017/0026218 A1 | 1/2017 | Shattil |
| 2017/0054480 A1 | 2/2017 | Shattil et al. |
| 2017/0054584 A1 | 2/2017 | Madaiah et al. |
| 2017/0126291 A1 | 5/2017 | Lea et al. |
| 2017/0126454 A1 | 5/2017 | Huan et al. |
| 2017/0126458 A1 | 5/2017 | Shattil |
| 2017/0134202 A1 | 5/2017 | Baligh et al. |
| 2017/0134235 A1 | 5/2017 | Wu et al. |
| 2017/0250848 A1 | 8/2017 | Lee et al. |
| 2017/0255593 A9 | 9/2017 | Agee |
| 2017/0264474 A1 | 9/2017 | He et al. |
| 2017/0279648 A1 | 9/2017 | Song et al. |
| 2017/0295000 A1 | 10/2017 | Yoo et al. |
| 2017/0331532 A1 | 11/2017 | Le-Ngoc |
| 2017/0353340 A1 | 12/2017 | Raphaeli et al. |
| 2018/0006692 A1 | 1/2018 | Noh et al. |
| 2018/0062904 A1 | 3/2018 | Hwang et al. |
| 2018/0075482 A1 | 3/2018 | Gierach |
| 2018/0091338 A1 | 3/2018 | Mayer et al. |
| 2018/0092086 A1 | 3/2018 | Nammi et al. |
| 2018/0109408 A1 | 4/2018 | Sandell et al. |
| 2018/0123846 A1 | 5/2018 | Kibutu et al. |
| 2018/0167244 A1 | 6/2018 | Cheng et al. |
| 2018/0191543 A1 | 7/2018 | Park et al. |
| 2018/0212810 A1 | 7/2018 | Park et al. |
| 2018/0219590 A1 | 8/2018 | Matsuda et al. |
| 2018/0262253 A1 | 9/2018 | Rahman et al. |
| 2018/0278303 A1 | 9/2018 | Hong et al. |
| 2018/0288809 A1 | 10/2018 | Delfeld et al. |
| 2018/0309599 A1 | 10/2018 | Lee |
| 2018/0332573 A1 | 11/2018 | Yu et al. |
| 2019/0036657 A1 | 1/2019 | Zhao et al. |
| 2019/0132177 A1 | 5/2019 | Wang et al. |
| 2019/0158338 A1 | 5/2019 | Hierath et al. |
| 2019/0181928 A1 | 6/2019 | Pan et al. |
| 2019/0190753 A1 | 6/2019 | Bayesteh et al. |
| 2019/0260441 A1 | 8/2019 | Akuon et al. |
| 2019/0393948 A1 | 9/2019 | Zhao et al. |
| 2020/0028727 A1 | 1/2020 | Chen |
| 2022/0060363 A1 | 2/2022 | Shattil |

FOREIGN PATENT DOCUMENTS

| | | |
|---|---|---|
| EP | 1835682 | 9/2007 |
| EP | 2449690 B1 | 5/2012 |
| EP | 2675072 | 12/2013 |
| EP | 2763321 A1 | 8/2014 |
| JP | H08331093 | 12/1996 |
| JP | 2004-147126 A | 5/2004 |
| JP | 2012-100323 | 5/2012 |
| JP | 2012109811 | 6/2012 |
| JP | 2011-229090 A | 6/2013 |
| JP | 2013-521741 A | 6/2013 |
| JP | 2017-537514 A | 12/2017 |
| KR | 10-2010-0019974 | 2/2010 |
| KR | 10-20090033703 | 8/2011 |
| WO | WO/2001/054303 | 7/2001 |
| WO | WO/2001/054303 | 4/2002 |
| WO | 0237771 | 5/2002 |
| WO | WO2007048278 | 5/2007 |
| WO | WO2014206461 | 12/2014 |
| WO | WO-2016115546 A1 * | 7/2016 ........... H04B 7/0452 |
| WO | WO-2017078779 A1 * | 5/2017 |
| WO | WO2017186301 | 11/2017 |
| WO | WO2018082791 | 5/2018 |
| WO | WO2018083601 | 5/2018 |
| WO | WO/2018174686 | 9/2018 |
| WO | WO/2019023283 | 1/2019 |

OTHER PUBLICATIONS

Z. Wu, et al.; "High-Performance 64-QAM OFDM via Carrier Interferometry Spreading Codes"; 2003 IEEE 58th Vehicular Technology Conference. VTC 2003-Fall (IEEE Cat. No. 03CH37484). Oct. 6-9, 2003.

B.Natarajan, C.R. Nassar and S.Shattil; "High-Throughput High-Performance TDMA Through Pseudo-Orthogonal Carrier Interferometry Pulse Shaping"; IEEE Transactions on Wireless Communications, vol. 3, No. 3, May 2004.

B.Natarajan, C.R. Nassar; "Introducing Novel FDD and FDM in MC-CDMA to Enhance Performance"; RAWCON 2000 2000 IEEE Radio and Wireless Conference (Cat. No. 00EX404). Sep. 13-13, 2000.

B.Natarajan, Z Wu, C.R. Nassar and S.Shattil; "Large Set of CI Spreading Codes for High-Capacity MC-CDMA"; IEEE Transactions on Communications, vol. 52, No. 11, Nov. 2004.

B.Natarajan, C.R. Nassar, Z Wu; "Multi-carrier platform for wireless communications. Part 1: High-performance, high-throughput TDMA and DS-CDMA via multi-carrier implementations"; Wireless Communications and Mobile Computing; Wirel. Commun. Mob. Comput. 2002; 2:357-379 (DOI: 10.1002/wcm.51) Jun. 18, 2002.

S.A. Zekavat, C.R. Nassar and S.Shattil; "Merging Multicarrier CDMA and Oscillating-Beam Smart Antenna Arrays: Exploiting Directionality, Transmit Diversity, and Frequency Diversity"; IEEE Transactions on Communications, vol. 52, No. 1, pp. 110-119, Jan. 2004.

(56) References Cited

OTHER PUBLICATIONS

C.R. Nassar, B.Natarajan, Z. Wu, D. Wiegandt, and S.Shattil; Multi-Carrier Technologies for Wireless Communication; Kluwer Academic Publishers 2002.

B.Natarajan, C.R. Nassar, S. Shattil; "Novel Multi-Carrier Implementation of FSK for Bandwidth Efficient, High Performance Wireless Systems"; 2002 IEEE International Conference on Communications. Conference Proceedings. ICC 2002 (Cat. No. 02CH37333) Apr. 28-May 2, 2002.

D.A. Wiegandt, C.R. Nassar, Z. Wu; "Overcoming Peak-to-Average Power Ratio Issues in OFDM via Carrier-Interferometry Codes"; IEEE 54th Vehicular Technology Conference. VTC Fall 2001. Proceedings (Cat. No. 01CH37211), Oct. 7-11, 2001.

D.A. Wiegandt, C.R. Nassar; "Peak-to-Average Power Reduction in High-Performance, High-Throughput OFDM via Pseudo-Orthogonal Carrier-Interferometry Coding"; PACRIM. 2001 IEEE Pacific Rim Conference on, vol. 2, Feb. 2001.

X. Lin, et al.; "5G New Radio: Unveiling the Essentials of the Next Generation Wireless Access Technology"; IEEE Communications Standards Magazine ( vol. 3 , Issue: 3 , Sep. 2019 ) pp. 30-37. Dec. 6, 2019.

"D2.2 Architecture, system and interface definitions of a 5G for Remote Area network"; Project website: http://5g-range.eu; Version 1 date Apr. 26, 2018.

R. Rani, et al.; "Peak-to-Average Power Ratio Analysis of SCFDMA Signal by Hybrid Technique"; International Journal of Computer Applications (0975-8887) vol. 69—No. 15, May 2013.

H. Kim, et al.; "Multiple Access for 5G New Radio: Categorization, Evaluation, and Challenges"; arXiv:1703.09042 [cs.IT], Mar. 27, 2017.

A. Anand, et al.; "Joint Scheduling of URLLC and eMBB Traffic in 5G Wireless Networks"; IEEE INFOCOM 2018—IEEE Conference on Computer Communications; Apr. 16-19, 2018.

M. Bennis, et al.; "Ultra-Reliable and Low-Latency Wireless Communication: Tail, Risk and Scale"; Proceedings of the IEEE ( vol. 106 , Issue: 10 , Oct. 2018 ).

B.G. Agee; "Efficient Allocation of RF Transceiver Resources in Spatially Adaptable Communication Networks"; SDR Forum/MPRG Workshop on Advanced in Smart Antennas for Software Radios, at Virginia Polytechnic Institute, Blacksburg, VA.

C.A. Azurdia-Meza, et al.; "PAPR reduction in SC-FDMA by pulse shaping using parametric linear combination pulses", IEEE Communications Letters, vol. 16, No. 12, Dec. 2012.

C.A. Azurdia-Meza, et al.; "PAPR Reduction in Single Carrier FDMA Uplink by Pulse Shaping Using a β-α Filter"; Wireless Pers Commun 71, 23-44 (2013). https://doi.org/10.1007/s11277-012-0794-0; Aug. 9, 2012.

A Hamed, et al.; "Bandwidth and Power efficiency analysis of fading communication link"; 2016 International Symposium on Performance Evaluation of Computer and Telecommunication Systems (SPECTS); Jul. 24-27, 2016.

Y. Akhtman, L Hanzo; "Power Versus Bandwidth Efficiency in Wireless Communications: from Economic Sustainability to Green Radio"; China Communications 7(2) • Apr. 2010.

L. Militano, et al.; "Device-to-Device Communications for 5G Internet of Things"; EAI Endorsed Transactions on Internet of Things; Ghent vol. 1, Iss. 1, (Oct. 2015).

M. Vergara, et al.; "Multicarrier Chip Pulse Shape Design With Low Papr"; 21st European Signal Processing Conference (EUSIPCO 2013); Sep. 9-13, 2013.

C. Liu, et al.; "Experimental demonstration of high spectral efficient 4×4 MIMO SCMA-OFDM/OQAM radio over multi-core fiber system"; Optics Express 18431, vol. 25, No. 15 | Jul. 24, 2017.

F. Wei, et al.; "Message-Passing Receiver Design for Joint Channel Estimation and Data Decoding in Uplink Grant-Free SCMA Systems"; IEEE Transactions on Communications, vol. 18 , Issue: 1 , Jan. 2019: Nov. 6, 2018.

H. Jiang, et al.; "Distributed Layered Grant-Free Non-Orthogonal Multiple Access for Massive MTC"; 2018 IEEE 29th Annual International Symposium on Personal, Indoor and Mobile Radio Communications (PIMRC); Sep. 9-12, 2018.

S. Sengar, P.B. Bhattacharya; "Performance Improvement in OFDM System by PAPR Reduction Using Pulse Shaping Technique"; International Journal of Emerging Technology and Advanced Engineering, vol. 2, Issue 12, Dec. 2012.

B.H. Alhassoun; "Peak-to-Average-Power-Ratio (PAPR) Reduction Techniques for Orthogonal-Frequency-Division-Multiplexing (OFDM) Transmission"; Thesis, University of Denver, Jun. 1, 2012.

A. Boonkajay, et al.; "Performance Evaluation of Low-PAPR Transmit Filter for Single-Carrier Transmission"; 2012 18th Asia-Pacific Conference on Communications (APCC); Oct. 15-17, 2012.

D. Das; "Peak to Average Power Ratio Reduction in OFDM Using Pulse Shaping Technique"; Computer Engineering and Applications vol. 5, No. 2, ISSN: 2252-5459 (Online) Jun. 2016.

D. Wulich, et al.; "Peak to Average Power Ratio in Digital Communications"; https://www.academia.edu/6222108/Peak_to_Average_Power_Ratio_in_Digital_Communications 2005.

S. Singh, et al.; "Analysis of Roll-Off-Factor to Reduce the PAPR in SC-FDMA System"; International Journal of Computational Intelligence Techniques, ISSN: 0976-0466 & E-ISSN: 0976-0474, vol. 3, Issue 2, 2012, pp. 76-78.

M. Mahlouji, T. Mahmoodi; "Analysis of Uplink Scheduling for Haptic Communications"; arXiv:1809.09837 [cs.NI], Sep. 26, 2018.

K. Au, et al.; "Uplink Contention Based SCMA for 5G Radio Access"; 2014 IEEE Globecom Workshops (GC Wkshps), Dec. 8-12, 2014.

S. Shah, A.R. Patel; "LTE—Single Carrier Frequency Division Multiple Access"; Jan. 1, 2010.

S.L. Ariyavisitakul, et al.; "Frequency Domain Equalization for Single-Carrier Broadband Wireless Systems"; IEEE Communications Magazine ( vol. 40 , Issue: 4 , Apr. 2002 ); pp. 58-66, Aug. 7, 2002.

A. Agarwal and P. R. Kumar, "Improved capacity bounds for wireless networks." Wireless Communications and Mobile Computing, vol. 4, pp. 251-261, 2004.

J.F. Cardoso, A. Souloumiac, "Blind Beamforming for non-Gaussian Signals," IEEE-Proceedings-F, vol. 140, No. 6, pp. 362-370, Dec. 1993.

D. Galda; H. Rohling, "A low complexity transmitter structure for OFDM-FDMA uplink systems", IEEE 55th Vehicular Technology Conference. VTC Spring 2002, May 6-9, 2002.

P. Gupta and P. R. Kumar, "The Capacity of Wireless Networks," IEEE Trans. Info. Theory, vol. IT-46, No. 2, Mar. 2000, pp. 388-404.

T. Kailath, Linear Systems, Prentice-Hall, Inc., 1980.

T. May; H. Rohling, "Reducing the peak-to-average power ratio in OFDM radio transmission systems", VTC '98. 48th IEEE Vehicular Technology Conference. May 21-21, 1998.

J.D. Schaffer, "Multiple objective optimization with vector evaluated genetic algorithms," Proceedings of 1st International Conference on Genetic Algorithms, 1991, pp. 93-100.

Z. Wu, C.R. Nassar, "Combined Directionality and Transmit Diversity via Smart Antenna Spatial Sweeping," RAWCON 2000, IEEE Radio and Wireless Conference 2000, p. 103-106. Sep. 13, 2000.

S.A. Zekavat; C.R. Nassar; S. Shattil, "Combining multi-input single-output systems and multi-carrier systems: achieving transmit diversity, frequency diversity and directionality", Vehicular Technology Conference. IEEE 55th Vehicular Technology Conference. VTC Spring 2002, May 6-9, 2002.

S.A. Zekavat, C. R. Nassar and S. Shattil, "Smart antenna spatial sweeping for combined directionality and transmit diversity," Journal of Communications and Networks (JCN), Special Issue on Adaptive Antennas for Wireless Communications, vol. 2, No. 4, pp. 325-330, Dec. 2000.

E. Zitzler and L. Thiele, "Multiobjective evolutionary algorithms: A comparative case study and the strength pareto approach," IEEE Tran. on Evol. Comput., vol. 3, No. 4, Nov. 1999, pp. 257-271.

D. Gerakoulis and E. Geraniotis, CDMA: Access and Switching for Terrestrial and Satellite Networks, John Wiley & Sons, LTD, 2001. ITU-T, Asymmetric Digital Subscriber Line (ADSL) Transceivers, G.992.1, Jun. 1999.

Written Opinion dated Nov. 5, 2018 from corresponding PCT Application No. PCT/US2018/043573.

(56) References Cited

OTHER PUBLICATIONS

International Search Report dated Nov. 5, 2018 from corresponding PCT Application No. PCT/US2018/043573.
Extended European Search Report dated Mar. 18, 2021 from corresponding EPO Application No. 18837572.9.
Examination Report, India Patent Office, dated Jul. 26, 2021 from corresponding India Application No. 202047007281.
Examination Report dated Jan. 12, 2022 from corresponding EPO Application No. 18837572.9.
Notice of Reasons for Refusal dated May 19, 2022 from corresponding Japan Appl. No. 2019-556330.
C-Y. Hsu, et al.; "Novel SLM Scheme with Low-Complexity for PAPR Reduction in OFDM System", IEICE Trans. Fundamentals, vol. E91-A. No. 7, pp. 1689-1696, Jul. 2008.
N. Jacklin, et al.; "A Linear Programming Based Tone Injection Algorithm for PAPR Reduction of OFDM and Linearly Precoded Systems", IEEE Trans. on Circuits and Systems-I: Regular Papers, vol. 60, No. 7, pp. 1937-1945, Jul. 2013.
T. Dias, R.C. de Lamare; "Study of Unique-Word Based GFDM Transmission Systems"; https://arxiv.org/pdf/1805.10702.pdf, May 27, 2018.
R. Ferdian, et al.; "Efficient Equalization Hardware Architecture for SC-FDMA Systems without Cyclic Prefix"; 2012 International Symposium on Communications and Information Technologies (ISCIT): pp. 936-941, Oct. 2012.
M. Au, et al.; "Joint Code-Frequency Index Modulation for IoT and Multi-User Communications"; IEEE Journal of Selected Topics in Signal Processing (vol. 13, Issue: 6, Oct. 2019).
I.M. Hussain; "Low Complexity Partial SLM Technique for PAPR Reduction in OFDM Transmitters"; Int. J. on Electrical Engineering and Informatics, vol. 5, No. 1, Mar. 2013.
Z. Wang, et al.; "Linearly Precoded or Coded OFDM against Wireless Channel Fades?"; Third IEEE Signal Processing Workshop on Signal Processing Advances in Wireless Communications, Taoyuan, Taiwan, Mar. 20-23, 2001.
B.E. Priyanto, et al.; "Initial Performance Evaluation of DFT-Spread OFDM Based SC-FDMA for UTRA LTE Uplink;" 2007 IEEE 65th Vehicular Technology Conference—VTC2007—Spring; May 29, 2007.
H. Wu, et al., "Sum rate analysis of SDMA transmission in single carrier FDMA system"; Communication Systems, 2008. ICCS 2008. 11th IEEE Singapore International Conference; Dec. 2008.
R. Stirling-Gallacher; "Multi-Carrier Code Division Multiple Access," Ph. D. Thesis, University of Edinburgh; Aug. 1997.
T. Ginige, et al.; "Dynamic Spreading Code Selection Method for PAPR Reduction in OFDM-CDMA Systems With 4-QAM Modulation"; IEEE Communications Letters, vol. 5, No. 10; Oct. 2001.
C.R. Nassar, V.K. Garg, S.J. Shattil; "Discovery of uniform multicarrier frameworks for multiple-access technologies"; SPIE Proceedings [SPIE ITCom 2001: International Symposium on the Convergence of IT and Communications—Denver, CO (Monday Aug. 20, 2001)].
B. Natarajan, C.R. Nassar, S. Shattil; "High Data Rate FSK via Multi-Carrier Implementations for Wireless Personal Area Networks"; Proceedings of SPIE—The International Society for Optical Engineering, Oct. 2002.
S. Shattil, C.R. Nassar; "Improved Fourier Transforms for Multi-carrier Processing"; Conference on Emerging Technologies for Future Generation Wireless Communications, Jul. 29-30, 2002, Boston, Massachusetts, Proceedings of SPIE vol. 4869 (2002).
S. Hijazi, M. Michelini, B. Natarajan, Z. Wu; "Enabling FCC's proposed spectral policy via carrier interferometry", Conference: Wireless Communications and Networking Conference, 2004. WCNC. 2004 IEEE vol. 4.
M. Michelini, S. Hijazi, C.R. Nassar, Z. Wu; "Spectral sharing across 2G-3G systems"; Signals, Systems and Computers, 2003. Conference Record of the Thirty-Seventh Asilomar Conference on vol. 1.

C.R. Nassar, F. Zhu, Z. Wu; "Direct Sequence Spreading UWB Systems: Frequency Domain Processing for Enhanced Performance and Throughput"; Communications, 2003. ICC '03. IEEE International Conference on vol. 3.
K. Chen, B. Natarajan, S. Shattil, "Secret Key Generation Rate With Power Allocation in Relay-Based LTE-A Networks," in IEEE Transactions on Information Forensics and Security, vol. 10, No. 11, pp. 2424-2434, Nov. 2015.
Yuanwei Liu et al., 'Non-Orthogonal Multiple Access for 5G and Beyond', arXiv:1808.00277, Aug. 1, 2018 [retrieved on Aug. 21, 2020]. Retrieved from <URL: https://arxiv.org/abs/1808.00277> pp. 1-54.
H. Prakash, C.D.Suriyakala; "PAPR Reduction in MIMO SC-FDMA—A Survey"; Int. J Rec. Adv. Sci. Tech., 2015;2(2):11-19.
E. Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.
J. Shin, B. Seo; "PAPR Reduction Scheme for MISO and MIMO OFDM Systems with Limited Feedback"; WSEAS Transactions on Communications 13:355-362—Jan. 2014.
D. Sinanovic, et al.; "Low PAPR Spatial Modulation for SC-FDMA"; IEEE Transactions on Vehicular Technology; vol. 66, Issue: 1, Jan. 2017.
G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.
M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.
M. Vu, A. Paulraj; "MIMO Wireless Linear Precoding"; IEEE Signal Processing Magazine. Submitted Feb. 2006, revised Nov. 2006 and Dec. 2006.
H.G. Myung, et al.; "Peak Power Characteristics of Single Carrier FDMA MIMO Precoding System"; 2007 IEEE 66th Vehicular Technology Conference, Sept 30.-Oct. 3, 2007.
B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.
A.S. Parihar, A. Rai; "A Review: PAPR Reduction Techniques in MIMO OFDM System"; International Journal of Engineering and Innovative Technology (IJEIT); vol. 4, Issue 12, Jun. 2015.
B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).
C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.
K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.
K. Srinivasarao, et al.; "Peak-to-Average Power Reduction in MIMO OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L. Goeckel; "Peak Power Reduction in Closed-Loop MIMO-OFDM Systems via Mode Reservation"; Communications Letters, vol. 11, No. 7, Jul. 2007.
C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.

(56) References Cited

OTHER PUBLICATIONS

H-B Jeon, et al.; "Bit-Based SLM Schemes for PAPR Reduction in QAM Modulated OFDM Signals"; IEEE Transactions on Broadcasting, vol. 55, No. 3, Sep. 2009.

H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.

S-J Heo, et al.; "A Modified SLM Scheme With Low Complexity for PAPR Reduction of OFDM Systems"; IEEE Transactions on Broadcasting, vol. 53, No. 4, Dec. 2007.

M.I. Abdullah, et al.; "Comparative Study of PAPR Reduction Techniques in OFDM"; ARPN Journal of Systems and Software; vol. 1, No. 8, Nov. 2011.

E. Abdullah, et al.; "Modified selective mapping scheme with low complexity for minimizing high peak average power ratio in orthogonal frequency division multiplexing system"; AIP Conference Proceedings 1774, 050005 (2016).

S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.

P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.

D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.

B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.

C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.

C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.

B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.

Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.

S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.

B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.

Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.

B. Natarajan, C.R. Nassar, S. Shattil; "Innovative pulse shaping for high-performance wireless TDMA," Communications Letters, IEEE vol. 5, Issue 9, Sep. 2001 pp. 372-374.

B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.

V.Thippavajjula, B.Natarajan; "Parallel Interference Cancellation Techniques for Synchronous Carrier Interferometry/MC-CDMA Uplink"; IEEE 60th Vehicular Technology Conference, 2004. VTC2004-Fall. Sep. 26-29, 2004.

A. Serener, et al.; "Performance of Spread OFDM with LDPC Coding in Outdoor Environments"; 2003 IEEE 58th Vehicular Technology Conference. VTC 2003-Fall (IEEE Cat. No. 03CH37484), Oct. 6-9, 2003.

LTE: Evolved Universal Terrestrial Radio Access (E-UTRA); Multiplexing and channel coding (3GPP TS 36.212 version 8.8.0 Release 8), Jan. 2010.

LTE: Evolved Universal Terrestrial Radio Access (E-UTRA); Physical channels and modulation (3GPP TS 36.211 version 8.7.0 Release 8), Jun. 2009.

B.Natarajan, C.R. Nassar and S.Shattil; "CI/FSK: Bandwidth-Efficient Multicarrier FSK for High Performance, High Throughput, and Enhanced Applicability"; IEEE Transactions on Communications, vol. 52, No. 3, Mar. 2004.

G. Wunder, K.G. Paterson; "Crest-Factor Analysis of Carrier Interferometry MC-CDMA and OFDM systems"; International Symposium onInformation Theory, 2004. ISIT 2004. Proceedings. Jun. 27-Jul. 2, 2004.

B.Natarajan, C.R. Nassar "Crest Factor Reduction in MC-CDMA Employing Carrier Interferometry Codes"; EURSAP Journal on Wireless Comm. and Networking 2004:2, 374-379.

A.J. Best, B.Natarajan; "The Effect of Jamming on the Performance of Carrier Interferometry/OFDM"; WiMob'2005), IEEE International Conference on Wireless and Mobile Computing, Networking and Communications, 2005. Aug. 24-22, 2005.

S. Hijazi, et al.; "Enabling FCC's Proposed Spectral Policy via Carrier Interferometry"; 2004 IEEE Wireless Communications and Networking Conference (IEEE Cat. No. 04TH8733). Mar. 21-25, 2004.

Z. Wu, et al.; "FD-MC-CDMA: A Frequency-based Multiple Access Architecture for High Performance Wireless Communication"; Proceedings RAWCON 2001. 2001 IEEE Radio and Wireless Conference (Cat.No. 01EX514). Aug. 19-22, 2001.

P. Barbosa, et al.; "High-Performance MIMO-OFDM via Carrier Interferometry"; GLOBECOM '03. IEEE Global Telecommunications Conference (IEEE Cat. No. 03CH37489). Dec. 1-5, 2003.

D.A. Wiegandt, C.R. Nassar; "High-Throughput, High-Performance OFDM via Pseudo-Orthogonal Carrier Interferometry"; 12th IEEE International Symposium on Personal, Indoor and Mobile Radio Communications. PIMRC 2001. Proceedings (Cat. No. 01TH8598) Oct. 3-Sep. 30, 2001.

D.A. Wiegandt, C.R. Nassar; "High-Throughput, High-Performance OFDM via Pseudo-Orthogonal Carrier Interferometry Type 2"; The 5th International Symposium on Wireless Personal Multimedia Communications. Oct. 27-30, 2002.

D.A. Wiegandt, C.R. Nassar; "High-Throughput, High-Performance OFDM via Pseudo-Orthogonal Carrier Interferometry Spreading Codes"; IEEE Transactions on Communications, vol. 51, No. 7, pp. 1123-1134. Jul. 2003.

B. Weinstein, P. Ebert; "Data Transmission by Frequency-Division Multiplexing Using the Discrete Fourier Transform"; IEEE Transactions on Communications; Oct. 1971.

A. Czylwik. "Comparison Between Adaptive OFDM and Single Carrier Modulation with Frequency Domain Equalization"; 1997 IEEE 47th Vehicular Technology Conference. Technology in Motion; May 4-7, 1997.

Intel Corporation; "Numerology for New Radio Interface" (R1-162386); 3GPP TSG RAN WG1 Meeting #84bis; Busan, Korea Apr. 11-15, 2016.

Qualcomm Incorporated; "Numerology requirements" (R1-162204); 3GPP TSG RAN WG1 Meeting #84bis; Busan, Korea, Apr. 11-15, 2016.

J. Zyren; "Overview of the 3GPP Long Term Evolution Physical Layer"; Document No. 3GPPEVOLUTIONWP; Jul. 2007. https://pdf4pro.com/view/overview-of-the-3gpp-long-term-evolution-physical-layer-7a50af.html.

IXIA; "SC-FDMA Single Carrier FDMA in LTE"; 915-2725-01 Rev A Nov. 2009. https://support.ixiacom.com/sites/default/files/resources/whitepaper/sc-fdma-indd.pdf.

(56) References Cited

OTHER PUBLICATIONS

Telesystem Innovations; "LTE in a Nutshell: The Physical Layer"; 2010. https://pdf4pro.com/view/lte-in-a-nutshell-mywww-zhaw-4c4210.html.
ETSI TS 136 211 V8.7.0 (Jun. 2009); "Evolved Universal Terrestrial Radio Access (E-UTRA); Physical Channels and Modulation" (3GPP TS 36.211 version 8.7.0 Release 8).
ETSI TS 138 211 V15.2.0 (Jul. 2018); "5G; NR; Physical channels and modulation"; (3GPP TS 38.211 version 15.2.0 Release 15).
ETSI TS 136 211 V15.2.0 (Oct. 2018); "LTE; Evolved Universal Terrestrial Radio Access (E-UTRA); Physical Channels and Modulation" (3GPP TS 36.211 version 15.2.0 Release 15).
ShareTechnote; "5G/NR—PHY Candidate"; https://www.sharetechnote.com/html/5G/5G_Phy_Candidate_DFTsOFDM.html.
EventHelix; "5G physical layer specifications"; Dec. 25, 2017; https://medium.com/5g-nr/5g-physical-layer-specifications-e025f8654981.
ETSI TR 121 905 V8.6.0 (Oct. 2008); "Digital cellular telecommunications system (Phase 2+); Universal Mobile Telecommunications System (UMTS); Vocabulary for 3GPP Specifications"; (3GPP TR 21.905 version 8.6.0 Release B).
ETSI TS 136 211 V8.4.0 (Nov. 2008); "LTE; Evolved Universal Terrestrial Radio Access (E-UTRA); Physical channels and modulation"; (3GPP TS 36.211 version 8.4.0 Release 8).
Z. Wang, et al.; "Wireless multicarrier communications"; IEEE Signal Processing Magazine ( vol. 17, Issue: 3, May 2000).

* cited by examiner

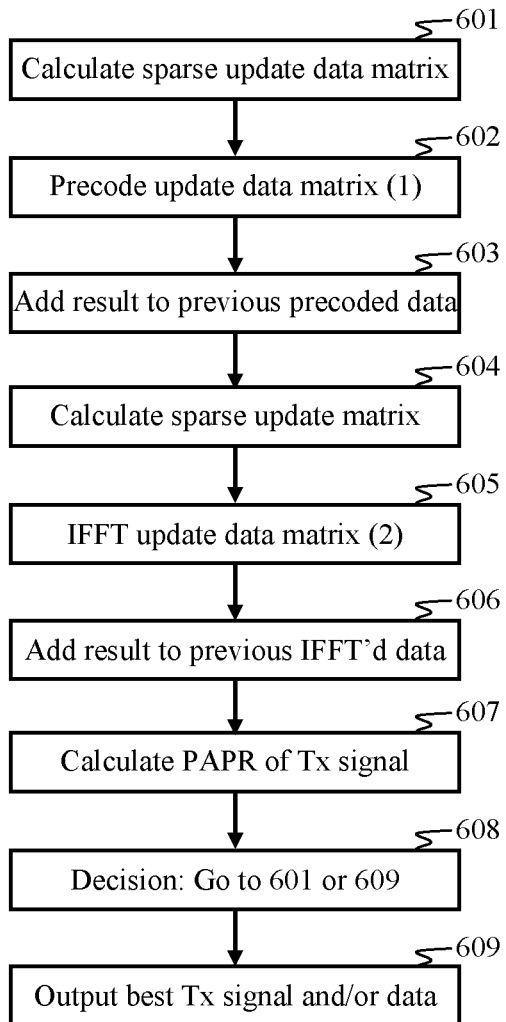
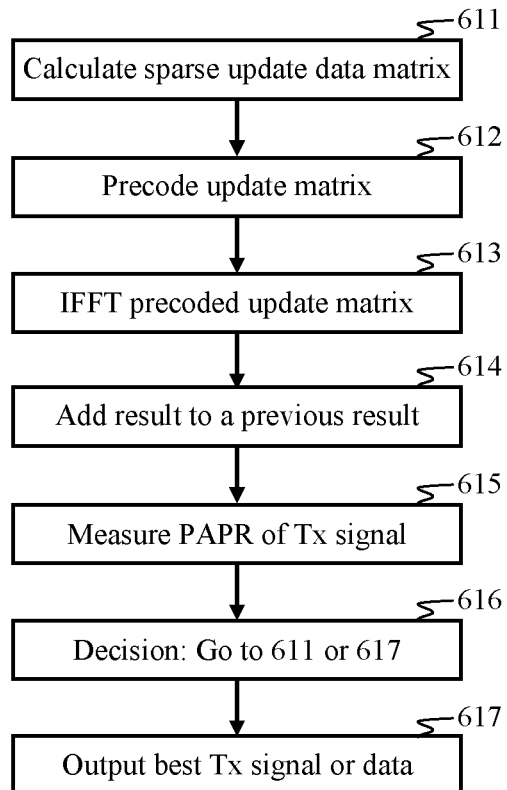
FIG. 6A
FIG. 6B

EFFICIENT SYNTHESIS AND ANALYSIS OF OFDM AND MIMO-OFDM SIGNALS

CROSS REFERENCE TO PRIOR APPLICATIONS

This application is a Continuation of U.S. patent application Ser. No. 17/517,461, filed Nov. 2, 2021, now U.S. Pat. No. 11,570,029; which is a Continuation of U.S. Pat. application Ser. No. 17/234,519, filed Apr. 19, 2021, now U.S. Pat. No. 11,196,603; which is a Continuation of U.S. patent application Ser. No. 16/932,753, now U.S. Pat. No. 10,985,961; which is a Continuation of U.S. patent application Ser. No. 16/709,093, filed Dec. 10, 2019, now U.S. Pat. No. 10,728,074; which is a Continuation of U.S. patent application Ser. No. 16/364,734, filed Mar. 26, 2019, now U.S. Pat. No. 10,505,774; which is a Continuation of U.S. patent application Ser. No. 16/021,001, filed Jun. 27, 2018, now U.S. Pat. No. 10,243,773; which claims priority to Provisional Appl. No. 62/527,603, filed Jun. 30, 2017; and Provisional Appl. No. 62/536,955, filed Jul. 25, 2017; and this application is a Continuation of U.S. patent application Ser. No. 17/245,297, filed Apr. 30, 2021; which is a Continuation of U.S. patent application Ser. No. 16/779,657, filed Feb. 2, 2020, now U.S. Pat. No. 11,018,918; which is a Continuation of U.S. patent application Ser. No. 15/988,898, filed May 24, 2018, now U.S. Pat. No. 10,637,705; which claims priority to Provisional Appl. No. 62/510,987, filed May 25, 2017; and Provisional Appl. No. 62/527,603, filed Jun. 30, 2017; and Provisional Appl. No. 62/536,955, filed Jul. 25, 2017; all of which are hereby incorporated by reference in their entireties and all of which this application claims priority under at least 35 U.S.C. 120 and/or any other applicable provision in Title 35 of the United States Code.

BACKGROUND

I. Field

The present invention relates generally to wireless communication networks, and more specifically to precoding multicarrier waveforms.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

In multi-user communications, orthogonal frequency division multiple access (OFDMA) offers flexible resource allocation (subcarrier allocations to users) and scheduling. Dynamic allocation can further improve performance compared to fixed allocation. For these reasons, OFDMA has been adopted as the downlink in LTE.

However, OFDMA suffers from high peak-to-average power ratio (PAPR) because the modulated subcarriers for different users combine randomly to produce a signal with highly variable amplitude. This requires RF power amplifiers (PAs) to operate with large back-offs (i.e., transmitter PAs are made to operate at low efficiency operating points to ensure linearity).

The high PAPR problem is further complicated by multiple-input, multiple-output (MIMO) precoding. It is well known that PAPR performance of multi-layer precoded MIMO-OFDM is worse than Single Input, Single Output (SISO) OFDM and MIMO-OFDM without precoding. This is because, in addition to the transmitted OFDM signal comprising a superposition of the modulated subcarrier frequencies, each transmitted subcarrier signal comprises a superposition signal due to spatial processing.

The poor power efficiency and increased cost of radio components is deemed acceptable in sparse deployments of large base stations. However, in dense LTE deployments, base stations are more power constrained, as dense deployments demand radio terminals that are significantly less expensive and operate at lower power. As LTE adopts fixed and mobile relays, the network infrastructure will rely more on autonomously powered (e.g., solar-powered) and battery-powered devices for downlink support. This will further drive the need for improvements in power-efficient downlink signaling.

Similarly, user devices can be tasked with relaying WWAN radio transmissions. It is also anticipated that user devices will cooperate to transmit MIMO-OFDM signals in the uplink. For at least these reasons, improvements to PAPR-reduction in both the uplink and downlink signaling are needed. Peer-to-peer communications between user devices and communications between clusters of user devices are also envisioned. Thus, the aforementioned improvements are needed in a wide variety of network configurations.

It is especially important to improve PAPR performance in precoded MIMO-OFDM without degrading other system performance metrics, such as Bit Error Rate (BER) and bandwidth efficiency. Furthermore, there is a need for improvements to MIMO-OFDM processing that reduce PAPR without adding significantly to latency and computational overhead.

SUMMARY

In accordance with some aspects of the disclosure, the aforementioned needs are solved. Aspects disclosed herein can be configured for downlink, uplink, relay links, peer-to-peer links, as well as other links, and such aspects are not constrained to any particular communication network topologies. Aspects disclosed herein are broadly applicable to wireless communications, including (but not limited to) cellular, mobile broadband, fixed broadband, Internet of Things (IoT), peer-to-peer networks, mesh networks, wireless personal area networks (WPANs), wireless local area networks (WLANs), wireless sensor networks, airborne networks, satellite networks, network fabrics, software-defined networks (SDNs), and hybrid networks.

An exemplary aspect of the disclosure provides for selecting a plurality $M_T$ of transmitting terminals (such as may be used for uplink and/or downlink communications) in a radio access network, comprising selecting a subset of the transmitting terminals to comprise one or more ($M_T - m_T$) of the terminals configurable to permit transmission of high-PAPR signals (i.e., non-PAPR-sensitive terminals) while one or more ($m_T < M_T$) terminals have a low-PAPR constraint (i.e., referred to as PAPR-sensitive terminals), thereby providing for additional degrees of freedom in a PAPR-reduction calculation that enables generation of transmission signals with a reduced PAPR to be transmitted by the $M_T$ PAPR-sensitive terminal(s).

In some aspects, non-PAPR-sensitive terminals are line powered, whereas PAPR-sensitive terminals are battery powered. However, aspects may differentiate between non-PAPR-sensitive terminals and PAPR-sensitive terminals based on one or more other criteria based on features and/or operating conditions pertaining to each terminal, such as (but not limited to) power amplifier linearity, battery life, channel conditions, modulation symbol constellation, and/or transmit power. In some aspects, this differentiation may be updated as operating conditions for the terminals change, when terminals join or leave a distributed antenna system, or when a scheduling algorithm is employed, such as for distributing power loads across the terminals.

Exemplary PAPR-reduction methods include pre-coding, selective mapping, and PAPR-reduction symbol injection. However, aspects disclosed herein are not limited to the aforementioned PAPR-reduction methods, and may comprise alternative PAPR-reduction methods. Pre-coding may be performed by a precoder, such as a spatial-multiplexing (e.g., MIMO) precoder, a spread-OFDM precoder (such as a spreader, which may comprise a DFT-based spreader), a phase-offset precoder (which may be configured to phase-offset subsets of OFDM subcarriers and/or spatial subchannels), and/or a modulator (such as a modulator that adjusts a modulation symbol constellation). Depending on the type of pre-coding performed, alternative devices may be employed. Selective mapping, by way of example, may be performed by a modulator configured with a mapper function that maps data streams to input bins of a fast Fourier transform (FFT), a MIMO processor configured to perform layer selection that maps data streams to antennas and/or MIMO subspaces (such as MIMO eigenvectors, eigendirections, or eigenspaces), and/or other devices configured to perform selective mapping. Data-symbol injection may, by way of example, employ a modulator and/or a mapper configured to inject each PAPR-reduction symbol into a resource block, a layer (which may include a MIMO subspace), or a combination thereof.

Prior to implementing the aforementioned PAPR-reduction methods, PAPR-reduction calculations are performed to select pre-coding, mapping, and/or PAPR-reduction symbols that will achieve a desired reduction in PAPR of the transmitted signals, typically within one or more computing constraints, such as processing complexity and latency. Aspects disclosed herein can achieve a desired PAPR-reduction with better performance (such as measured by the number of processing operations, processing time, memory use, and/or at least one other performance metric). Aspects disclosed herein can achieve better PAPR-performance for a given set of computing resources and/or computing constraints.

At least one of the $M_T$ transmitting terminals may communicatively connect via a backhaul network to centralized or remote computing resources configured to perform at least some PAPR-reduction calculations, such as corresponding to any of the PAPR-reduction methods disclosed herein. In some aspects, a line-powered one of the transmitting terminals is selected to operate as a network hub and perform the PAPR-reduction calculations, in which case the backhaul may be implemented via a local area network. A hub, the computing resources, or at least one transmitting terminal may measure latency in the backhaul link, compare the latency (which may include latency due to the communication with, and processing by, the computing resources) to a latency threshold value, and if the measured latency is below the latency threshold value, provision the computing resources to perform the calculations. Operation of the computing resources may be configured (such as by the transmitting terminal or the hub, for example) based on the measured latency so that processing time plus the measured latency does not exceed a predetermined amount. In an exemplary aspect, the remote computing resources employ a partial update method with sparse matrices to perform the PAPR-reduction calculations.

In one aspect, a hub or a data center Cloud comprising the computing resources can comprise a precoder configured to calculate precoding weights. The precoder may provision at least one designated subspace channel for transmitting at least one PAPR-reduction symbol (e.g., a PAPR-reduction channel), and a PAPR-reduction symbol generator may be embodied in the precoder. The PAPR-reduction symbol generator may calculate one or more PAPR-reduction symbols in each symbol interval to be transmitted in the at least one designated subspace channel concurrently with at least one other subspace channel used for communicating user data, control data, management data, and/or reference symbols. The one or more PAPR-reduction symbols are calculated to reduce PAPR of transmit signals at one or more of the $M_T$ terminals while permitting high PAPR at one or more non-PAPR-sensitive terminals. By lessening the PAPR constraints on one or more non-PAPR-sensitive terminals, additional versatility in the selection of precoding weights is afforded to achieve reduced PAPR at the other terminals. A partial-update method that employs sparse matrices can update the precoding weights.

In some aspects of the disclosure, a precoder has three effects: decoupling the input signal into orthogonal spatial modes, such as in the form of eigen-beams, allocating power over these beams, such as based on the channel state information (CSI), and introducing symbols into one or more subspace channels to reduce the PAPR at one or more transmit antennas. If the precoded orthogonal spatial-beams match the channel eigen-directions (the eigenvectors of H*H, where H denotes the channel matrix), there will be no interference among signals sent on different modes, thus creating parallel channels and allowing transmission of independent signal streams. This allows the insertion of PAPR-reduction symbols in one of the modes, for example, without destroying orthogonality between the modes. In aspects in which the PAPR-reduction symbols in OFDM are not spread in the frequency domain, introducing a PAPR-reduction symbol into a space-frequency channel, for example, preserves both orthogonality in the frequency domain and orthogonality between the spatial modes. However, introduction of a symbol into a space-frequency channel impacts the PAPR differently at each transmit antenna due to differences in the precoding weight values of the selected subspace at each of the transmit antennas. There can be up to $M_t$ orthogonal subspaces corresponding to each OFDM subcarrier frequency (where $M_t$ is the number of transmitting antennas), and those subspaces can vary greatly for different OFDM subcarrier frequencies, thus providing a large number of degrees of freedom for finding an advantageous combination of space-frequency channel(s) and PAPR-reduction symbol(s) that achieves PAPR-reduction criteria. This can be achieved via multi-objective optimization, for example. In some aspects, antennas that are not highly sensitive to high PAPR are included in a transmit antenna set to reduce the constraints or increase the number of degrees of freedom in the corresponding multi-objective problem. Additional degrees of freedom can be realized by employing antenna selection, wherein the set of $M_t$ antennas is selected from a larger set of candidate antennas. A partial-update method that employs sparse matrices can be used to update the weights in such aspects.

Aspects of the disclosure can be configured to operate with spread data symbols and in systems that employ spreading codes.

Some aspects disclosed herein assume full channel knowledge at the transmitter. With partial CSI, the precoder can approximately match its eigen-beams to the channel eigen-directions to reduce interference among signals sent on these beams. This is the decoupling effect. Moreover, the precoder allocates power on the beams. By allocating power, the precoder may produce a radiation shape to match to the channel based on the CSI such that higher power is sent in directions where the channel is strong, whereas reduced or no power is transmitted where the channel is weak. In one aspect, PAPR-reduction symbols are sent on weak channels. In another aspect, strong channels are selected for carrying PAPR-reduction symbols. In some aspects, channel selection for PAPR-reduction symbols is determined dynamically, possibly for each symbol duration.

Aspects disclosed herein can provide for adding more transmit antennas, such as to increase the ability to finely shape the radiation patterns and provide more precoding gain. Additional benefits can include increasing the number of degrees of freedom in the multi-objective optimization for achieving PAPR-reduction. In some aspects, the number of selected transmit antennas remains constant while the pool of antennas from which the transmit antennas are selected is large. This can increase the number of degrees of freedom without the increased processing complexity for calculating larger precoding matrices. Selection of the transmit antennas may be performed via multi-objective optimization and employ partial-updates using sparse matrices, such as to increase speed and reduce computations for PAPR calculations.

Aspects of the disclosure provide for apparatus and method embodiments with reduced complexity for reducing PAPR in OFDM and MIMO-OFDM signals. A selective mapping weight matrix can be employed for any combination of PAPR-reduction techniques, including phase rotation, amplitude scaling, dummy symbol insertion (into OFDM resource blocks and/or layers), and symbol mapping to resource blocks and/or layers. In one aspect, a base discrete-time MIMO-OFDM signal is generated from a set of data symbols and MIMO precoding weights. A sparse update weight matrix is generated (or selected from a codebook) and used to multiply the set of data symbols to produce an update signal. The update signal is precoded with the MIMO precoding weights to produce a precoded update signal. An inverse discrete Fourier transform (IDFT) transforms the precoded update signal into a discrete-time update signal, which is with a previously generated base discrete-time MIMO-OFDM signal to produce an updated discrete-time MIMO-OFDM signal.

Aspects disclosed herein can be implemented as apparatus configurations comprising structural features that perform the functions, algorithms, and methods described herein. Flow charts and descriptions disclosed herein can embody instructions, such as in software residing on a non-transitory computer-readable medium, configured to operate a processor (or multiple processors). Flow charts and functional descriptions, including apparatus diagrams, can embody methods for operating a communication network(s), coordinating operations which support communications in a network(s), operating network components (such as client devices, server-side devices, relays, and/or supporting devices), and assembling components of an apparatus configured to perform the functions disclosed herein.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

The following patent applications and patents are hereby incorporated by reference in their entireties:
U.S. Pat. No. 8,670,390,
U.S. Pat. No. 9,225,471,
U.S. Pat. No. 9,270,421,
U.S. Pat. No. 9,325,805,
U.S. Pat. No. 9,473,226,
U.S. Pat. No. 8,929,550,
U.S. Pat. No. 7,430,257,
U.S. Pat. No. 6,331,837,
U.S. Pat. No. 7,076,168,
U.S. Pat. No. 7,965,761,
U.S. Pat. No. 8,098,751,
U.S. Pat. No. 7,787,514,
U.S. Pat. No. 9,673,920,
U.S. Pat. No. 9,628,231,
U.S. Pat. No. 9,485,063,
patent application Ser. No. 10/145,854,
patent application Ser. No. 14/789,949,
Pat. Appl. No. 62/197,336,
patent application Ser. No. 14/967,633,
Pat. Appl. No. 60/286,850,
patent application Ser. No. 14/709,936,
patent application Ser. No. 14/733,013,
patent application Ser. No. 14/789,949,
patent application Ser. No. 13/116,984,
patent application Ser. No. 15/218,609,
patent application Ser. No. 15/347,415,
Pat. Appl. No. 62/510,987,
Pat. Appl. No. 62/527,603,
J. S. Chow, J. M. Cioffi, J. A. C. Bingham; "Equalizer Training Algorithms for Multicarrier Modulation Systems," Communications, 1993. ICC '93 Geneva. Technical Program, Conference Record, IEEE International Conference on; Vol: 2, 23-26 May 1993, pp. 761-765;
Vrcelj et al. "Pre- and post-processing for optimal noise reduction in cyclic prefix based channel equalizers." Communications, 2002. ICC 2002. IEEE International Conference on. Vol. 1. IEEE, 2002;

LTE: Evolved Universal Terrestrial Radio Access (E-UTRA); Physical channels and modulation (3GPP TS 36.211 version 8.7.0 Release 8), June 2009; and LTE: Evolved Universal Terrestrial Radio Access (E-UTRA); Multiplexing and channel coding (3GPP TS 36.212 version 8.8.0 Release 8), January 2010.

All of the references disclosed herein all are incorporated by reference in their entireties.

BRIEF DESCRIPTION OF DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIGS. 4A, 4B, 5A, 5B, 6A, and 6B are flow diagrams that depict some of the aspects of the disclosure.

DETAILED DESCRIPTION

Figure 1A:
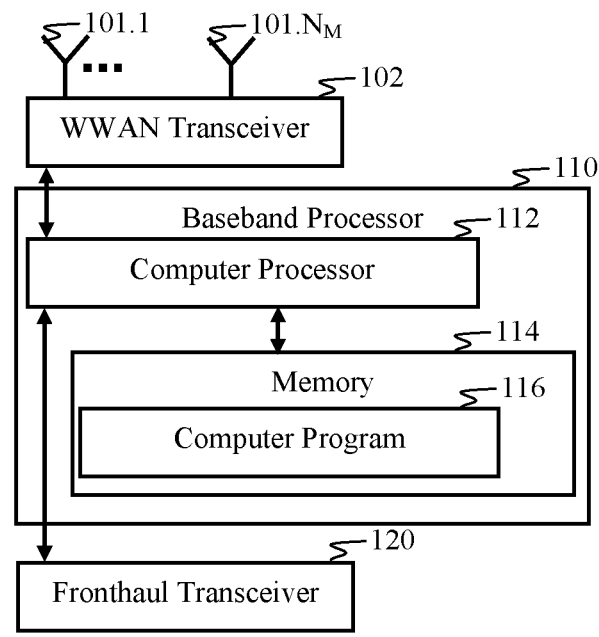
FIG. 1A is a block diagram of a radio terminal in which exemplary aspects of the disclosure can be implemented. Aspects of the disclosure are not limited to the depicted terminal design, as such aspects can be implemented in alternative devices, configurations, and applications.

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Aspects of the disclosure make use of the linearity property of an invertible transform operation to reduce computational complexity of an update procedure, wherein the update can employ a sparse matrix. For example, the DFT can be expressed by $\mathscr{F}[x[m]]=X(e^{i\omega})$, and the linearity property of the DFT is:

$$\mathscr{F}[ax[m]+by[m]]=aX(e^{i\omega})bY(e^{i\omega})a\mathscr{F}[x[m]]+b\mathscr{F}[y[m]] \quad \text{(eqn. 1)}$$

This means that the DFT of the sum of two matrices (such as sequences x and y) equals the sum of the DFTs of each of the matrices.

In one aspect of the disclosure, an OFDM transmitter determines an OFDM signal having the lowest PAPR from a set of candidate signal waveforms generated from different combinations of data symbols. Instead of performing the DFT over all the data symbols for each combination, the transmitter calculates the DFT of an update symbol vector to produce an updated transformed symbol vector, which is then added to a previous transformed symbol vector generated in a previous iteration. The update symbol vector is provided as a sparse vector, meaning that some of the values are zero. Thus, the DFT of the update symbol vector has lower computational complexity (such as fewer complex multiplications) than performing the DFT over the entire set of data symbols.

In one aspect, a base vector, transformed symbol vector $\mathcal{F}[d_1, d_2, \ldots, d_M]$, is generated for a given sequence of data symbols. To generate an updated transformed symbol vector $\mathcal{F}[d_m, d_2, \ldots, d_M]$, for example, an update symbol vector is calculated: $[d_m-d_1, 0, \ldots, 0]$. The transform of the update symbol vector is generated: $\mathcal{F}[d_m-d_1, 0, \ldots, 0]$, which is then added to the base vector, transformed symbol vector $\mathcal{F}[d_1, d_2, \ldots, d_M]$, to produce the updated transformed symbol vector. PAPR measurement may be performed on the updated transformed symbol vector.

If the PAPR for another sequence of data symbols is to be determined, then the updated transformed symbol vector could be designated as the base vector. Alternatively, another base vector can be selected, such as a transformed symbol vector from a previous iteration. For example, the transformed symbol vector can be stored in memory, possibly with other transformed symbol vectors. The transmitter can select a base vector from the memory as part of a process for generating an updated transformed symbol vector.

In one aspect, this procedure is performed for a given set of data sequences. In other aspects, the procedure is adaptable, such as to provide for adapting the data sequences and/or adapting the number of iterations performed based on the PAPR measurements. Data sequences may comprise different permutations of a given data set, different data symbols, or differently weighted data symbols, for example. The data may comprise user data, control data, reference symbols, or some combination thereof. The data may comprise a PAPR-reduction symbol provided only for PAPR reduction. The data may comprise weighted data symbols, wherein the weights adapt a data symbol's value (such as within predetermined tolerances) via amplitude, phase, or some combination thereof.

PAPR measurements for different data sequences may be compared to determine a next candidate data sequence. The transmitter may shuffle the order of data symbols and/or adapt one or more symbol values and/or weights in response to PAPR measurements. In such iterative processes wherein a small number of symbol values in the symbol vector are changed, the aforementioned update technique significantly reduces computational complexity. It should be appreciated that this update technique can be performed for other operations that distribute across addition and is not intended to be limited to the exemplary aspects disclosed herein. The update technique may be performed with other invertible transforms, such as those disclosed in the '163 application.

In general, matrix multiplication distributes across addition:

$$A(B+C)=AB+AC \quad \text{(eqn. 2)}$$

$$(B+C)D=BD+CD \quad \text{(eqn. 3)}$$

Where A is an m×n matrix and B and C are n×p matrices and D is a p×s matrix.

By way of example, and without limitation, the product of a precoding matrix A with a data vector (represented by the sum of data vectors B and C in eqn. 2) equals the sum of precoded data vectors B and C. In one aspect, AB is the base vector (possibly generated from a previous iteration), and C is an update symbol vector with some values equal to zero, which makes it a sparse vector. Thus, the updated precoded data vector A(B+C) is produced by precoding the sparse update symbol vector C and adding the resulting product to the base vector AB. The PAPR of the updated precoded data vector is measured. This process can be repeated for subsequent data vectors. Iterations may cease when a data vector produces a precoded signal below a predetermined PAPR, and the precoded signal is transmitted. Alternatively, a predetermined number of iterations may be performed and the precoded signal with the lowest PAPR is selected for transmission. Side information may be transmitted, if necessary.

In one aspect, the precoding matrix is a spatial precoding matrix. Thus, when a zero data value is precoded, it causes a null in a subspace channel. In one exemplary aspect, B contains a zero, which produces a null in one of the subspace channels. C contains all zeros except at the index where B contains the zero, which makes the calculation of precoded C very simple (e.g., m multiplications). This allows the precoded vector to be updated for a new data symbol in one of the spatial channels without requiring the full m×n calculations to calculate an entirely new precoded data vector. This facilitates PAPR reduction in MIMO.

In a multi-user MIMO transmitter that employs OFDM, the aforementioned update technique significantly reduces processing complexity by simplifying both precoding and DFT updates. In one aspect, a symbol in a space-frequency channel can be updated by employing a sparse update symbol vector with a non-zero value corresponding to the spatial subspace channel, followed by employing a sparse update symbol vector with a non-zero value corresponding to the subband. In another aspect, subspace precoding may follow subband signal generation, thus the order of sparse update symbol vector may be configured accordingly. In some aspects, more than one space-frequency channel may be adapted.

In some aspects, selective mapping may be performed, which can be facilitated by aspects in which sparse update symbol vectors are exploited, such as disclosed herein. Selective mapping may be performed across subbands, across spatial subspaces, across orthogonal spreading codes, and/or across other orthogonal signal spaces. Aspects of the disclosure can be configured to provide for processing sparse update symbol vectors to enable any of various permutations of the data symbols. For example, sparse update symbol vectors can be adapted to provide for swapping symbols in a data symbol vector, shifting data symbols, or otherwise changing a symbol vector.

In some aspects, a spreading matrix can be employed to spread data symbols in order to reduce the PAPR of the resulting spread signal, which may comprise a spread-OFDM signal. Depending on how the multiplication of the spreading matrix with the data vector is performed, each row or column of the spreading matrix corresponds to an orthogonal code space of the spread signal. Thus, to update a spread signal, any of the update techniques disclosed herein can be performed.

In one exemplary aspect, the transmitter selects a base spread-symbol vector generated by spreading a base data-symbol vector with a spreading matrix. The base spread-symbol vector might be generated in a previous iteration of an adaptive process, for example. The transmitter generates one or more sparse update symbol vectors. Each sparse update symbol vector is spread with the spreading matrix, and the resulting spread-symbol vector is added to the base spread-symbol vector to produce an updated spread-symbol vector. PAPR measurements can be made from the updated spread-symbol vector, or a signal produced therefrom, which can comprise additional processing operations on the updated spread-symbol vector before the PAPR measurement is made. Based on the PAPR measurement, the transmitter can select a new update symbol vector and/or select one of the spread-symbol vectors for transmission.

In one aspect, upon generating a spread-symbol vector, the transmitter provides for performing a DFT operation (such as an inverse fast Fourier transform) on the spread-symbol vector to generate a spread-OFDM signal, such as a SC-FDMA signal. Spread-OFDM signals comprise a superposition of modulated OFDM subcarriers, from which PAPR can be measured.

In another aspect, the transmitter performs an update process in accordance with the following expression:

$$\mathcal{F}[A(B+C)] = \mathcal{F}[AB] + \mathcal{F}[AC] \quad \text{(eqn. 4)}$$

A spreading matrix (A) spreads a base data symbol matrix (B), and the resulting base spread-symbol matrix [AB] is processed with a DFT operation [$\mathcal{F}$], such as an IFFT, to produce a base OFDM signal, $\mathcal{F}$[AB]. To update the base OFDM signal, such as to produce a new candidate signal (which may be part of an iterative PAPR-reduction), a sparse update data symbol matrix (C) is generated. Matrix C may be generated based on previous PAPR measurements and previous data symbol matrices. Matrix C is spread by matrix A, and the product is processed by the DFT operation to produce an update OFDM signal, which is then added to the base OFDM signal. The base OFDM signal may be selected from a memory where it was stored during a previous iteration of the update algorithm. A PAPR measurement of the resulting updated OFDM signal (or a signal derived therefrom) is performed.

In one aspect, the PAPR measurement is compared to one or more previous PAPR measurements. A new update symbol matrix may be generated based on the current and previous PAPR measurements, and the aforementioned update process repeated until a desired PAPR is obtained or a predetermined number of iterations is performed. In some aspects, if the PAPR of the current iteration is lower than the PAPR of all previous iterations, the updated OFDM signal is stored. The stored OFDM signal may be designated as a base OFDM signal to be used in a next iteration. If the stored OFDM signal is below a predetermined threshold or if it has the lowest PAPR of a predetermined number of stored OFDM signals, then it can be transmitted into the radio access network.

By way of example, and without limitation, eqn. 3 shows that the sum of precoding matrices B and C configured to precode a data symbol matrix (e.g., a data symbol vector D) is equivalently achieved by separately precoding the data symbol vector D with B and C, and then summing the products. In some aspects, for a given data symbol vector D, a precoding matrix is developed that provides for reduced PAPR. Thus, an adaptation to a base precoding matrix B can be provided using a sparse update precoding matrix C wherein at least some of the matrix values are zero. For example, the product CD may be determined and then added to BD, which may be a base calculated in a previous iteration. The PAPR is measured, the sum may be stored, possibly to be used as a base in a subsequent iteration, and then the next update precoding matrix is generated. This process is repeated a predetermined number of times or when some criterion is met, such as a threshold PAPR measurement.

In some aspects, the base matrix comprises a plurality of eigenmodes and the update matrix comprises at least one eigenmode. The update matrix may comprise one or more of the eigenmodes of the base matrix. In some aspects, the update matrix comprises a null space of the base matrix. The update matrix might exploit the null space of the transmission channel and/or one or more eigenmodes, including eigenmodes that may not be used for transmitting user data. The update matrix may employ an orthogonal projection matrix. The update matrix can be subtracted from the base matrix to reduce the PAPR of the transmitted signal. The update matrix can be adapted via iteration in order to reduce the PAPR to a desired amount.

FIG. 1A depicts a radio terminal. Aspects of the disclosure can be implemented in a baseband processor 110 comprising at least one computer or data processor 112, at least one non-transitory computer-readable memory medium embodied as a memory 114 that stores data and a program of computer instructions 116, and at least one suitable radio frequency (RF) transmitter/receiver 102 for bidirectional wireless communications via one or more antennas 101.1-101.$N_M$. Optionally, a fronthaul transceiver 120 can be provided for communicating with other devices, such as other radio terminals.

In some aspects, the radio terminal in FIG. 1A is a BTS (BTS), such as an eNodeB, an access point, or some other type of BTS. The antenna system 101.1-101.$N_M$ may comprise an antenna array with $N_M$ antennas. The antenna system 101.1-101.$N_M$ may comprise a distributed antenna array. The transceiver 102 may comprise a distributed transceiver configuration. For example, aspects of the disclosure can be implemented with a BTS communicatively coupled to one or more remote radio heads, relay nodes, at least one other BTS or the like. Each antenna 101.1-101.$N_M$ or each of a set of the antennas 101.1-101.$N_M$ may comprise its own transceiver. The transceiver comprises RF circuitry for transmitting and receiving signals in a radio access network (RAN), such as a mobile radio network or the like. In some aspects, the transceiver 102 comprises at least some RAN baseband processing circuitry. In some aspects, the BTS employs the fronthaul transceiver 120 to communicate with other BTSs over a fronthaul network. Processes disclosed herein can be performed by baseband processor 110 to produce low-PAPR transmission signals to be transmitted by other radio terminals, such as BTSs, UEs, relays, remote radio heads, and/or other radio terminals. In some aspects, the baseband processor 110 resides offsite from the BTS location.

The baseband processor 110 may employ distributed computing resources and storage, such as a Cloud-based system, for example. In some aspects, the baseband processor 110 is virtualized. Virtualization is well known in the art, and the baseband processor can be implemented according to usual and customary techniques for virtualizing processing, memory, routing, and/or other networking resources, as well as according to virtualization techniques disclosed in Applicant's other patent applications or that may be developed in the future.

In some aspects, the radio terminal in FIG. 1A is a UE or some other type of user device. The UE's antenna system 101.1-101.$N_M$ may employ an antenna array. In some aspects, the UE's antenna array 101.1-101.$N_M$ can comprise antennas on at least one other device which is communicatively coupled to the UE via a fronthaul network by the fronthaul transceiver 120. Cooperative-MIMO techniques may be employed for cooperatively processing signals in the antenna system 101.1-101.$N_M$. The UE may be communicatively coupled to other devices (e.g., other UEs, BTSs, relays, access points for other networks, external computer processing devices, or the like) via the fronthaul network. The UE may be communicatively coupled to the baseband processor 110 via the RAN. The baseband processor 110 may reside in the UE, in a BTS, in a relay node, and/or in at least one other type of device external to the UE. The baseband processor 110 may be configured to calculate PAPR-reduction signals for the UE and/or at least one other device in the RAN.

In some aspects, the radio terminal in FIG. 1A is a relay device. The relay device may employ an antenna array and/or it may be configured to perform cooperative array processing with at least one other radio terminal. As described above, the baseband processor 110 may reside on the radio terminal and/or on one or more devices communicatively coupled to the radio terminal. The baseband processor 110 may be configured to calculate PAPR-reduction signals for the radio terminal and/or at least one other device in the RAN.

Figure 1B:
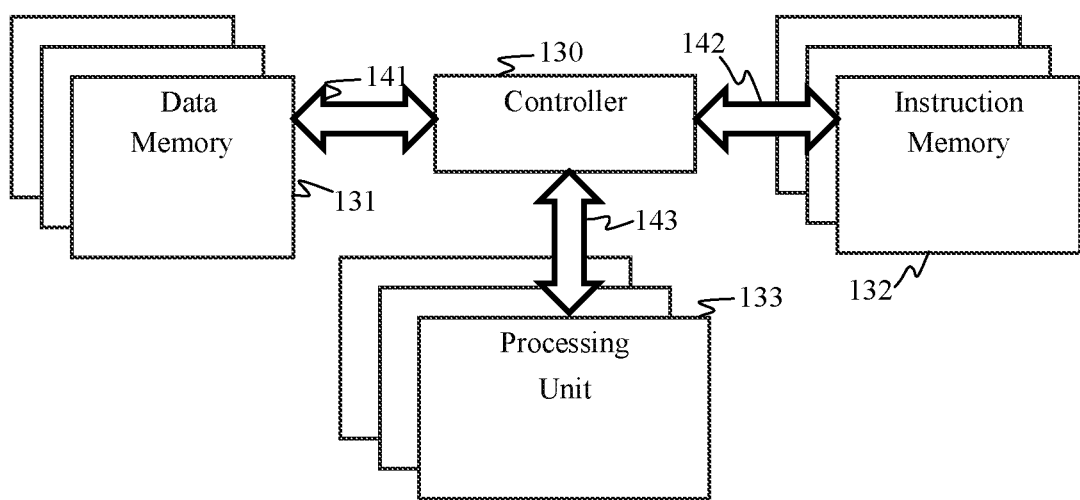
FIG. 1B is a block diagram depicting a processor architecture that can be programmed in accordance with aspects disclosed herein.

FIG. 1B illustrates a processor architecture that can be employed in accordance with aspects of the disclosure. Some aspects include a processor architecture designed for generating a plurality of MIMO-OFDM signals and computing the PAPR of those signals. A controller 130 comprises communication links 141 and 142 to one or more data memories 131 and one or more instruction memories 132, respectively. The controller 130 comprises a communication link(s) 143 to one or more processors 133. The controller 130 can comprise an input/output (I/O) device (not shown). The communication links 141, 142, and 143 can comprise computer buses, such as internal buses. In some aspects, the communication links 141, 142, and 143 might comprise high-speed networks that communicatively couple together different machines, possibly across large geographical distances.

In one aspect, an application specific instruction-set processor (ASIP) architecture can be employed for the processor by preparing arithmetic instructions that are specialized in complex matrix operations. Data and instructions are stored to each memory unit(s) 131 and 132, and the processing unit(s) 133 executes instructions in order. The floating-point data format supports complex values, wherein each part of a complex value comprises a 1-bit sign, a $W_e$-bits exponent, and $W_m$ bits mantissa. In the IEEE 754 standard, which may be employed herein, $W_e=8$, and $W_m=23$.

Data memories 131 and 132 and processing units 133 can be arrayed to support a number of parallel processing layers. Data transfers can comprise single-data transfer (which sends single data symbols one-by-one to the processor 133) and block transfer (which sends data blocks containing multiple entries to the processor 133).

In one exemplary aspect, the processing unit 133 comprises 9 floating-point units (FPUs) and dedicated circuits for division and square root operations. Some FPUs can be allocated for multiplication, some FPUs can be allocated for addition and subtraction, and one or more FPUs may be allocated for specific operations, such as CORDIC operations for calculating trigonometric functions. Efficient processing for complex matrix operations can be achieved by employing specialized instructions and an operation-unit structure. Employing dedicated circuits for division and square-root operations can provide effective hardware acceleration. Thus, division and square-root FPUs may be employed to reduce calculation time.

Figure 2:
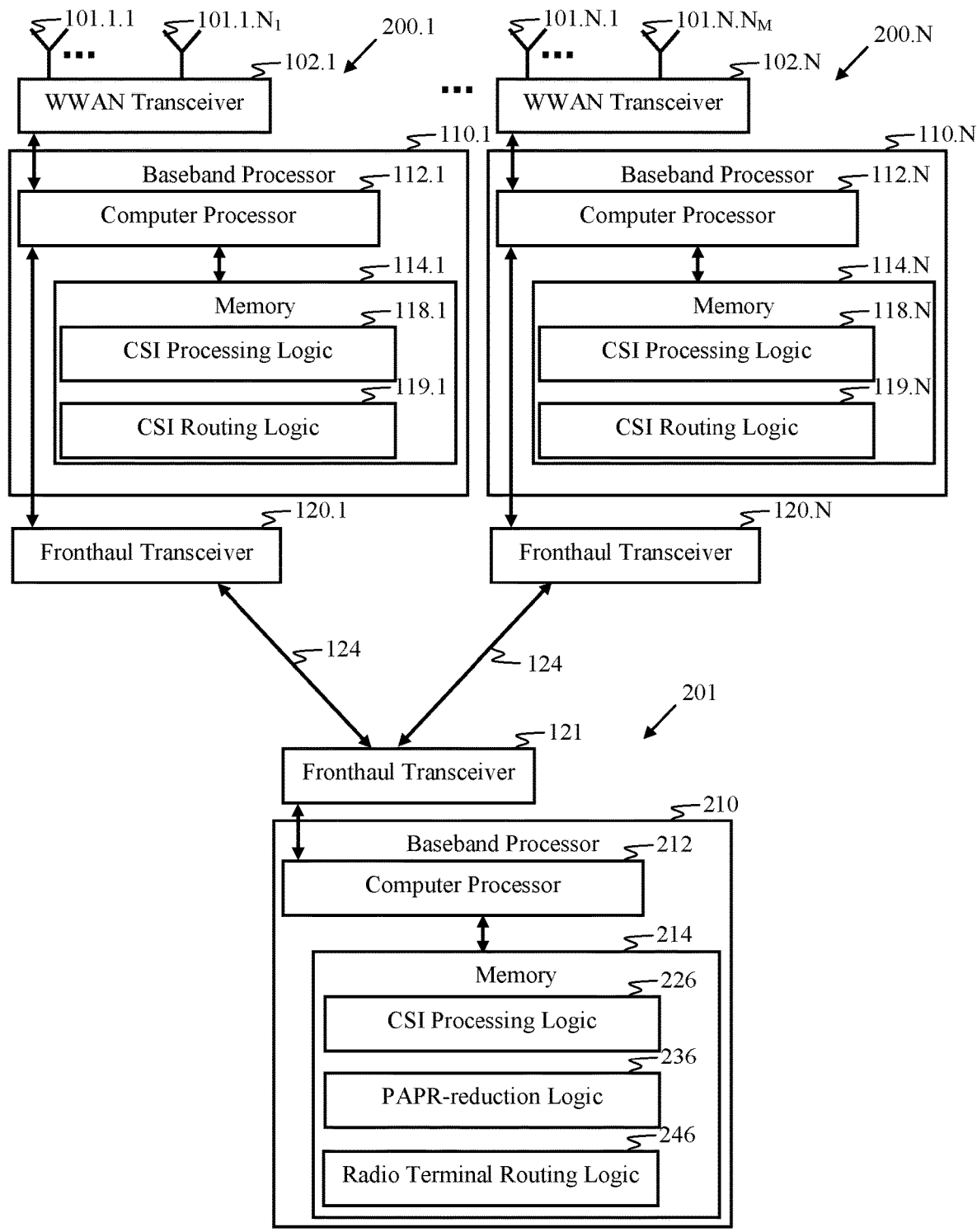
FIG. 2 depicts a radio terminal system in accordance with aspects of the disclosure.

FIG. 2 depicts a radio terminal system in accordance with aspects of the disclosure. A plurality N of radio terminals 200.1-N each comprise components similar to those as numbered in FIG. 1A, but bearing the index 1-N. Channel state information (CSI) may be measured and/or CSI measurements received by each radio terminal 200.1-N and processed by CSI processing logic 118.1-N. CSI routing logic 119.1-N may optionally be provided for routing information, such as CSI, over fronthaul network 124 to baseband processor 210.

The baseband processor 210 may reside on another radio terminal device, on some other device, or on a plurality of devices. At least one computer processor 212 is programmable with instructions stored on at least one memory 214. CSI processing logic 226 is configured to generate precoding for transmission signals based on the CSI. PAPR-reduction logic is configured to reduce PAPR of the transmission signals transmitted by at least one of the radio terminals 200.1-N in accordance with aspects of the disclosure. Routing logic 246 may optionally be provided in memory 214 for routing PAPR-reduction signaling to the terminals 200.1-N. PAPR-reduction signaling may comprise transmission signals (e.g., precoded data symbols, modulated precoded data signals, data symbols and precoding weights, and the like).

Figure 3:
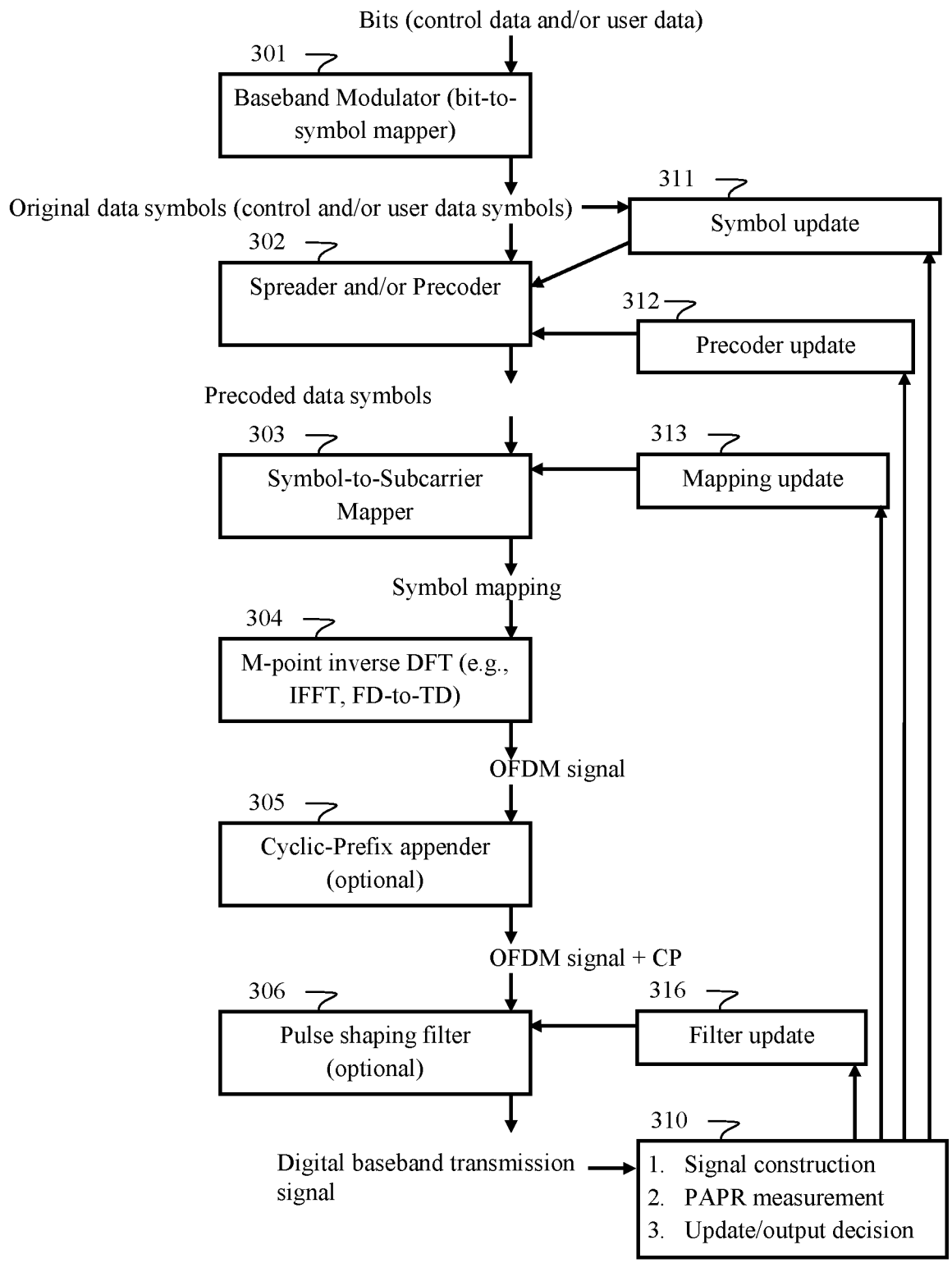
FIG. 3 is a block diagram that depicts modules corresponding to processing functions that can be implemented by a computer processor programmed to perform methods in accordance with aspects of the disclosure.

FIG. 3 is a block diagram that depicts modules corresponding to processing functions that can be implemented by a computer processor programmed to perform methods in accordance with aspects of the disclosure. The blocks can be interpreted as software modules, hardware components, or some combination thereof. The modules can represent steps in a method. In some aspects, the block diagram is indicative of structure and/or function of a client device (such as a UE) or a system of client devices.

In one aspect of the disclosure, FIG. 3 depicts a set of modules, each comprising instructions stored on a non-transitory computer-readable memory and configured to instruct a general-purpose processor (such as a processor core, a server, a distributed computing system, etc.) to perform functions disclosed herein. In other aspects, one or more modules can comprise a specific-purpose processor, such as an application-specific integrated circuit or some other circuit.

A baseband modulator, which can be implemented as a software module 301, transforms a binary input to a multi-level sequence of complex numbers in one of several possible modulation formats, including binary phase shift keying (BPSK), quaternary PSK (QPSK), 16-level quadrature amplitude modulation (16-QAM) and 64-QAM. The modulator 301 can adapt the modulation format, and thereby the transmission bit rate, to match current channel conditions of the transceiver. The output signal is referred to as original data symbols.

A precoder, which can be implemented as a software module 302 which provides precoding instructions to a processor, groups the original data symbols into blocks, each comprising N symbols. The precoder can be configured to perform an N-point DFT to produce a set of spread data symbols, also referred to as DFT-spread data symbols.

In some aspects, software module 302 is configured to perform spatial precoding. For example, the module 302 may employ CSI to generate a precoding matrix. Aspects of the disclosure anticipate that the software module 302 can be configured to perform any of various invertible transform operations on the original data symbols and/or derivatives thereof.

The software module 302 can be configured to produce precoded data symbols in accordance with subcarrier parameter(s) and at least one precoding criterion. Precoding criteria can include objectives, such as providing a PAPR below a predetermined threshold, providing orthogonality (which can comprise an evaluation, such as whether spreading code cross correlations are below a threshold value), and enabling efficient precoding (such as via a fast transform algorithm, or other types of processing). Other spreading criteria may be employed.

In some aspects, higher PAPR might be tolerable when a small constellation size (e.g., BPSK modulation) and/or low transmit power is employed, so spreading can be configured to improve processing efficiency and/or orthogonality at the expense of allowing for a higher PAPR. When high transmission power and/or modulations that produce a high-PAPR signal are employed, there might be less PAPR budget to exploit. Thus, the software module 302 might be configurable to sacrifice processing efficiency and/or orthogonality in favor of lower PAPR or vice versa.

In some aspects, pulse shaping can be performed by "windowing" the precoded signal. This can be performed as part of the precoding by the software module 302, or it may be performed by mapper 303, such as applied to inputs of an IFFT 304. For example, a tapered window can taper the amplitudes of at least some of the spread data symbols such that the taper is applied to the edges of the allocated spectrum. Raised cosine and Gaussian filter shapes can be used, but other types of pulse shaping may be employed.

The mapper 303 maps each of the N DFT outputs to one of M>N IFFT 304 frequency bins. An exemplary value of M is 256 subcarriers and $N=M/Q$ is an integer submultiple of M. $Q$ is the bandwidth expansion factor of the symbol sequence. The result of the subcarrier mapping is a set of complex subcarrier amplitudes, where N of the amplitudes are non-zero. The M-point IDFT 304 transforms the subcarrier amplitudes to a complex time domain signal comprising a superposition of modulated subcarriers, referred to herein as an OFDM signal.

The transmitter can comprise a cyclic prefix appender 305, which inserts a cyclic prefix in order to provide a guard time to prevent inter-block interference (MI) due to multipath propagation. In general, the cyclic prefix is a copy of the last part of the block, which is added at the start of each block. If the length of the cyclic prefix is longer than the maximum delay spread of the channel, or roughly, the length of the channel impulse response, then, there is no IBI. Since the cyclic prefix is a copy of the last part of the block, it converts a discrete time linear convolution into a discrete time circular convolution. Thus, transmitted data propagating through the channel can be modeled as a circular convolution between the channel impulse response and the transmitted data block, which, in the frequency domain, is a pointwise multiplication of the DFT frequency samples. Then, to remove the channel distortion, the DFT of the received signal can simply be divided by the DFT of the channel impulse response point-wise, or a more sophisticated frequency domain equalization technique can be implemented.

Additional baseband processing, such as via a pulse-shaping filter 306, can be performed. For example, pulse shaping can reduce out-of-band signal energy. In electronics and telecommunications, pulse shaping is the process of changing the waveform of transmitted pulses. Its purpose is to make the transmitted signal better suited to its communication channel, typically by limiting the effective bandwidth of the transmission. In RF communication, pulse shaping is essential for making the signal fit in its frequency band. At baseband, the time sequence of the spread-DFT signal is filtered by the pulse-shaping filter. The spectrum of the transmission is thus determined by the filter.

Digital-to-analog conversion (DAC), frequency up-conversion, and amplification are typically performed to produce a transmitted signal. In practical implementations, typical DACs use digital interpolation filtering before implementing the D-to-A conversion. By interpolating the data samples, the performance of the reconstruction filter is improved, as increasing the sampling frequency can be seen to directly reduce the analog filter requirements for alias suppression.

Interpolation in OFDM is typically performed by the IFFT 304. Interpolators in OFDM are described in U.S. Pat. No. 6,597,745, which is incorporated by reference, wherein a transform-domain interpolation unit expands a length-N transform domain vector by inserting zeros in the length-N transform domain vector to produce a length-2N transform domain vector. This transform-domain up-sampling unit interpolates the transform domain vector.

In some aspects of the disclosure, a signal after the IFFT 304 is processed to measure or estimate PAPR. For example, module 310 can measure the PAPR of a digital baseband transmission signal output by filter 306. In some aspects, the signal output from filter 306 is generated from an update signal, such as an update data matrix and/or an update transform matrix. Module 310 may combine the signal output from filter 306 with a base transmission signal to produce an updated transmission signal, followed by PAPR measurement, and then a decision process that can determine whether to generate a new update signal or output the current updated signal or a signal from a previous iteration. In some aspects, the module's 310 decision process outputs data to at least one transmitter configured to operate upon the data to generate a transmission signal with low PAPR.

In some aspects, a symbol update module 311 is responsive to module 310 to generate one or more new data symbols, change the order of a set of data symbols, and/or adapt one or more values of a set of data symbols. The data symbols can comprise user data, control data, reference symbols, dummy data, or some combination thereof. The symbol update module 311 may be configured to perform selective mapping. The update module 311 generates a sparse data matrix, which modules 302-306 operate on to produce an update digital baseband transmission signal. Module 310 then adds the update digital baseband transmission signal to a base signal generated in a previous iteration, for example, to produce an updated signal. In alternative aspects, module 310 processes the signal at some The PAPR of the updated signal is measured. The updated signal may be stored in memory. The updated signal may be designated as a base signal to be used in a subsequent iteration and/or employed as a transmission signal if its PAPR meets a predetermined criterion.

In some aspects, a precoder update module 312 is provided. The precoder update module 312 may be responsive to module 310 to update the precoder 302. It should be appreciated that while aspects of the disclosure describe matrix operations, the implementation of modules 302 and/or 304 may be implemented via any alternative functions that are equivalent to the described matrix operations. Either or both modules 311 and 312 may be employed.

In some aspects, mapping update module 313 may be provided. For example, responsive to module 310, the module 313 may update which data symbols are mapped to which OFDM subcarriers. Module 313 may update which of a set of subcarriers are employed. Module 313 may update complex weights applied to one or more of the subcarriers. Module 313 may be employed with modules 311 and/or 312.

Optionally, a filter update module 316 may be employed to adapt one or more parameters of the filter 306, such as to reduce the PAPR.

The exemplary aspects of the disclosure may be implemented, at least in part, by computer software executable by a processor in a UE, a data processor in a BTS, by a central processor, by a network manager, by multiple data processors in a distributed computing system, and/or by hardware, or by a combination of software, hardware, and firmware.

Figure 4A:
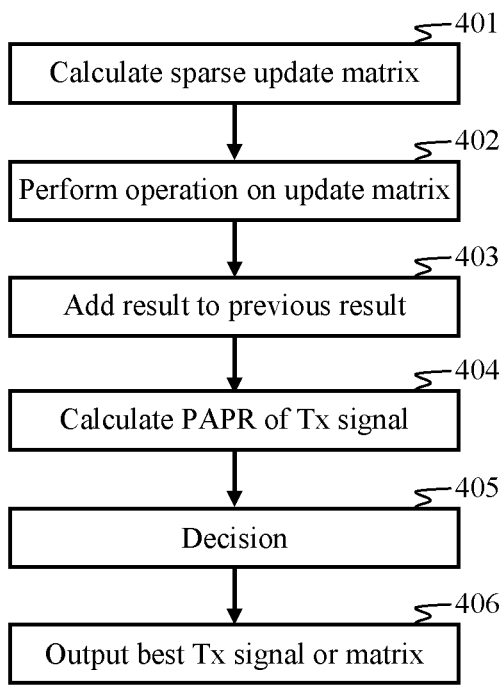

FIG. 4A is a flow diagram that depicts some aspects of the disclosure. A sparse update matrix is calculated 401, possibly based on a PAPR measurement of a candidate transmit signal. A matrix operation or equivalent function that distributes over addition is performed on the update matrix 402, and the result is added to a previous result (e.g., a base signal) 403. The operation 402 might comprise precoding and/or OFDM modulation. Operation 402 can include spreading and other invertible transforms. Operation 402 might further comprise mapping, appending a cyclic prefix, filtering, and/or other operations that also distribute over addition. PAPR calculation 404 is performed on a candidate transmission signal, or a signal from which a transmission signal can be produced. A decision block 405 determines, based on the PAPR, whether to perform another iteration (e.g., control returns to 401) or output a transmission signal (or data from which a transmission signal can be produced) 406. The decision block 405 can provide for storing the transmission signal, PAPR, and/or corresponding update data matrix in memory.

Figure 4B:
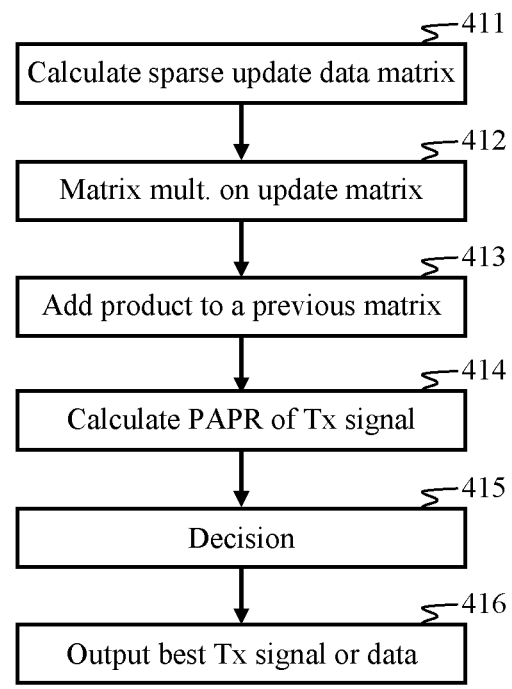

FIG. 4B is a flow diagram that depicts some aspects of the disclosure. A sparse update data matrix is calculated 411, followed by matrix multiplication or an equivalent process on the update matrix 412. The resulting update product can be added to a base matrix generated from a previous iteration 413. Equivalently, block 413 can provide for additional processing that distributes across addition, and the processed update product can be added to a similarly processed base matrix from a previous iteration. PAPR calculation 414 is followed by decision processing 415, which either returns control to 411 or selects a signal for transmission 416.

Figure 5A:
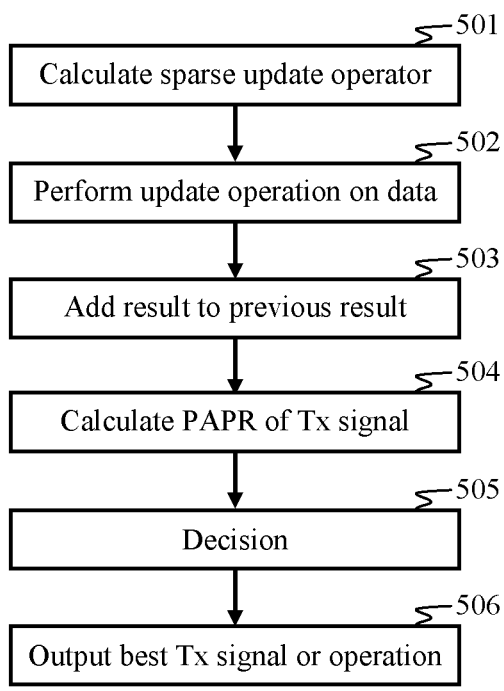

FIG. 5A is a flow diagram that depicts some aspects of the disclosure. A sparse update operator is calculated 501, followed by an update operation 502 on a data set using the sparse update operator to produce a result. The operation distributes across addition, so the result is added to a previous result 503, such as a result corresponding to a base operator. PAPR is calculated 504 for a corresponding transmission signal generated from the sum 503. A decision 505 returns control to 501 for another iteration or outputs a best transmission (and/or corresponding data) 506.

Figure 5B:
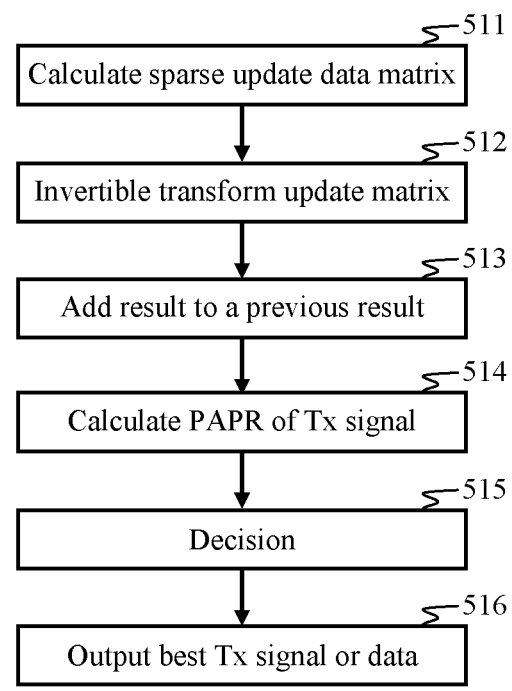

FIG. 5B is a flow diagram that depicts some aspects of the disclosure. A sparse update data matrix is calculated 511, followed by an invertible transform operating on the update matrix 512. The resulting transformed data can be added to a base transformed data generated from a previous iteration 513. PAPR calculation 514 is followed by decision processing 515, which either returns control to 511 or selects a signal for transmission 516.

FIG. 6A is a flow diagram that depicts some aspects of the disclosure. A sparse update data matrix is calculated 601, followed by a precoding operating on the update matrix 602. The update precoded data can be added to a base precoded data generated in a previous iteration 603. A sparse update matrix can be calculated 604 from the sum in 603. For example, an update (such as 601) confined to a spatial multiplexing subspace might also be confined to a subband, thus the sparse update matrix in 604 might only update the corresponding subband. The new matrix (indicated by "(2)") is transformed by an IFFT 605 or similar operation. The resulting transformed update is added to a base transformed signal 606, and the sum is processed for PAPR measurement 607. A decision process 608 employs the PAPR measurement to direct control to 601 or 609. The best transmit signal (and/or corresponding data) determined from a plurality of iterations is output for transmission 609.

FIG. 6B is a flow diagram that depicts some aspects of the disclosure. A sparse update data matrix is calculated 611, followed by a precoding operating on the update matrix 612. An IFFT is performed on the precoded update 613, and the output of the IFFT 613 is added to a base transmit signal 614, which may be determined during a previous iteration. PAPR measurement 615 of the sum is followed by a decision process 616, which directs control to 611 or 617. The best transmit signal (and/or corresponding data) determined from a plurality of iterations is output for transmission 617.

Figure 7:
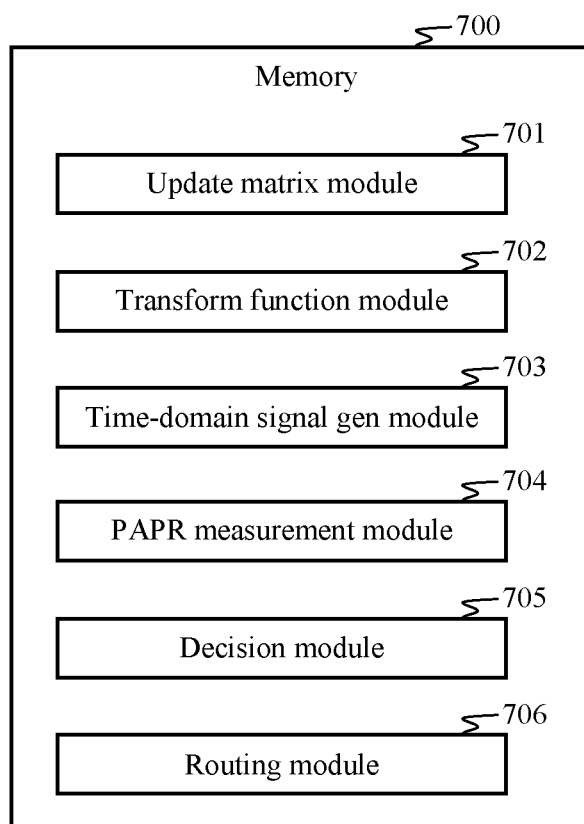
FIG. 7 is a block diagram that depicts a non-transient computer-readable memory comprising a set of instructions stored therein and executable by a processor to perform methods in accordance with aspects of the disclosure.

FIG. 7 is a block diagram that depicts a non-transient computer-readable memory 700 comprising a set of instructions stored therein and executable by a processor to perform methods in accordance with aspects of the disclosure. In one aspect, the instructions can comprise a software interface such as to provide for access to resources (e.g., functions, variables, etc.) inside a program or source code segment. Interfaces between software components can provide constants, data types, types of procedures, exception specifications, and/or method signatures. Sometimes public variables are defined as part of an interface. A software interface may provide access to computer resources, such as memory, CPU, storage, etc.). In some aspects, a software module comprises an interface and an implementation, wherein the implementation can contain code configured to perform procedures and methods described in the interface, as well as comprising private variable, procedures, and/or other structures and/or capabilities.

In one aspect, data symbols, such as corresponding to user data, control information, reference symbols, and/or some combination thereof, is input to an update matrix module 701 configured to generate an updated data symbol matrix relative to a previous data symbol matrix. In another aspect, update matrix module 701 generates an update transform operation matrix relative to a previous transform operation matrix. Module 701 operates as part of a PAPR signal reduction process, which may be an iterative process. Module 701 may calculate updates that it determines will reduce PAPR of a transmission signal or is likely to reduce PAPR of a transmission signal. The module 701 may employ analytical and/or deterministic processes to generate the updates.

Transform function module 702 can be configured to perform one or more transform operations on input data symbols, such as updated data symbols from module 701. The transform operation(s) distribute across addition. The transform operation(s) can comprise one or more invertible transforms. The transform operation(s) can comprise combined transform operations. The module 702 may perform matrix operations or equivalent processing operations.

Time-domain signal generation module 703 produces a time domain signal (e.g., a transmit signal) from transformed data produced by module 702. Module 703 may be configured to perform OFDM modulation, for example, and may comprise an IFFT or an alternative process configured to generate OFDM signals. Module 703 may be configured to append a cyclic prefix, perform pulse shaping, and/or provide for other post-modulation signal processing.

PAPR measurement module 704 measures PAPR for time-domain signals and/or estimates PAPR for time-domain signals that can be generated from predetermined data symbols and transform functions.

Decision module 705 is configured to compare PAPR measurements, direct update processing, and output low-PAPR transmit signals and/or data from which low-PAPR transmit signals can be generated. Module 705 may provide information to modules 701 and/or 702, such as to support or direct update processing of data and/or transform functions.

Routing module 706 can optionally be provided, such as to communicate low-PAPR signals and/or corresponding data signals to a set of transmitters via a network. Routing module 706 might operate cooperatively with network nodes to provide for virtualization of computing resources, such as in a Cloud configuration.

Aspects disclosed herein exploit partial update techniques to effect computationally efficient processing for reducing the PAPR of an OFDM signal. This is applicable to various types of OFDM signals, including (but not limited to) MIMO-OFDM signals and OFDMA signals. In MIMO-OFDM, a PAPR-based metric can take into account PAPR measurements across the plurality $N_t$ of MIMO transmitters or a predetermined subset of the $N_t$ of the transmitters, and a set of adaptation parameters (e.g., selective mapping symbols, dummy data symbols, as well as others disclosed herein) can be selected corresponding to a "best" PAPR-based metric.

Aspects disclosed herein can comprise data-independent updating schedules, data-dependent updating schedules, and combinations thereof. Data-dependent updating schedules can have faster convergence in some cases (e.g., for stationary signals) than algorithms that have data-independent updating schedules.

A step size parameter used for updating adaptation parameters can be determined to provide desirable conditions, such as convergence conditions and/or stability. The step size may be constant or it may be variable based on one or more measurement criteria. In some aspects, conditions on the step size parameter are derived that provide convergence in the mean and the mean square sense.

In some aspects, the parameters to be updated in a data-independent updating schedule are chosen at random. Aspects may employ a stochastic partial update algorithm. In one example, parameters to be updated are partitioned into multiple subsets of the total set of parameters, and then the subsets are randomly selected to be updated in each iteration. In some aspects, a predetermined schedule of parameters to be updated in each iteration is provided.

Partial-update algorithms employed herein can be configured to reduce the number of computations and take into account costs for increased program and data memory. For example, the reduction in number of execution cycles might be offset by the additional cycles needed for storing the data in intermediate steps. A processing metric to be optimized by the algorithm can comprise any combination of these costs.

Let $\{x_{i,k}\}$ be an input data sequence and let $\{w_{i,k}\}$ denote coefficients of an adaptive filter of length N.

$$w_k = [w_{1,k} w_{2,k} \ldots w_{N,k}]^T$$

$$x_k = [x_{1,k} x_{2,k} \ldots x_{N,k}]^T$$

where the terms defined above are for the instant k and $()^T$ denotes the transpose operator. The problem is to select $X_k$ and/or $W_k$ to obtain the OFDM signal with the lowest PAPR.

In some selective mapping aspects disclosed herein, multiple candidate symbol sequences $X_k$ can be provided. In some aspects, selective mapping can be effected by multiplying the input data symbol sequence $X_k$ with a phase-rotation matrix $W_k$. By way of example, a statistically independent symbol sequence $Z_k$ can be generated from $Z_k = W_k X$, where $W_k$ is a $k^{th}$ candidate phase-rotation matrix.

Some aspects can employ a partial transmit sequence (PTS) scheme wherein a phase-optimization technique can provide the optimal combination of signal subblocks. In some aspects, the values $W_k$ are selectable from candidate phase sequences. In some aspects, dummy sequence insertion (DSI) is employed. Combinations of the aforementioned PAPR-reduction techniques can be employed. For example, a combination of DSI and PTS schemes can be employed. Other combinations can be employed.

With OFDM modulation, a block of N data symbols (one OFDM symbol), $\{x_n, n=1, \ldots, N\}$ will be transmitted in parallel such that each modulates a different subcarrier from a set $\{f_n, n=0, 1, \ldots, N\}$. The N subcarriers are orthogonal, i.e. $f_n = n\Delta f$, where $\Delta f = 1/NT$ and T is the symbol period. The complex envelope of the transmitted OFDM signal is given as:

$$x_n(t) = \frac{1}{\sqrt{N}} \sum_{n=1}^{N} X_n e^{j2\pi f_n t}$$

where $0 \leq t \leq NT$.

The PAPR of the transmitted OFDM signal is $$PAPR = \frac{\max_{0 \leq t \leq NT} |x_n(t)|^2}{E[|x_n(t)^2|]} = \frac{\max_{0 \leq t \leq NT} |x_n(t)|^2}{\frac{1}{NT} \int_0^{NT} |x_n(t)|^2 dt}$$

where $E[\cdot]$ denotes the expected value. The complementary cumulative distribution function (CCDF) is one of the most frequently used performance measures for PAPR reduction, representing the probability that the PAPR of an OFDM symbol exceeds a given threshold, PAPRo, which is denoted as $CCDF = Pr(PAPR > PAPR_0)$. Other PAPR performance measures may be used, and aspects of the disclosure are not limited to performance measures disclosed herein.

The optimization problem of finding precoded data vectors that yield the OFDM signals with the minimum PAPR can be regarded as a combinatorial optimization problem. In some aspects, a sub-optimal technique derives precoding weights that provide an acceptable reduction in PAPR while achieving a significant reduction in search complexity.

Figure 8A:
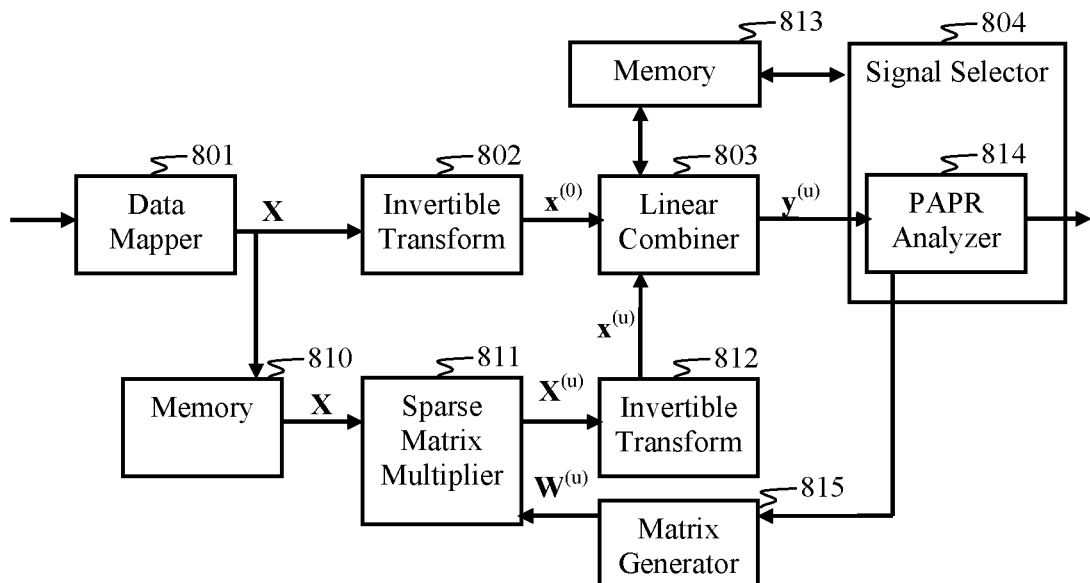
FIG. 8A is a block diagram of an SLM weight selector according to an exemplary aspect of the disclosure. This aspect employs a partial update method, such as can be realized by exploiting sparse matrix operations, in order to reduce the number of complex multiplications.

FIG. 8A is a block diagram of a selective mapping (SLM) weight selector according to an exemplary aspect of the disclosure. A data mapper 801 receives at least one input data stream and can map the data to layers and resource blocks. In the aspects depicted in FIG. 8A, the mapper 801 partitions received data symbols into blocks of length N, providing for input data symbols $X = [X_0 X_1 \ldots X_{N-1}]^T$ in a first block, for example. The symbols X might comprise data symbols output from a modulator, encoded data symbols, spread data symbols, precoded data symbols (e.g., MIMO-precoded data symbols), transform-precoded data symbols, or otherwise pre-processed data symbols. The mapper 801 might determine the block length N from scheduling information (such as by reading an uplink scheduling grant transmitted from an eNodeB. However, the PAPR-reduction aspects disclosed herein are contemplated for downlink transmissions as well), which is the number of OFDM subcarriers assigned to a transmitter. The data symbols in each block are then mapped (e.g., coupled to input frequency bins of an IFFT) to an invertible transform 802 in accordance with the set of OFDM subcarrier frequencies assigned to the transmitter.

It should be appreciated that the data mapper 801 can comprise a physical data storage medium, such as (but not limited to) random access memory, hard drive, virtual memory, and the like; and can comprise a data buffer, for example, and a data-processor for organizing and/or manipulating data in the data buffer and optionally provide for managing I/O operations. In some aspects, the data mapper 801 can comprise a serial-to-parallel (S/P) converter to convert an input serial data stream into a parallel set of N symbol outputs. By way of example, the data mapper 801 can comprise a serial-in/parallel-out shift register that converts data from serial format to parallel format. Other S/P circuits may be provided.

The invertible transform 802 can comprise an IDFT, such as an IFFT. An N-point IFFT operation is expressed as F, which can comprise $M = \log_2 N$ stages, wherein each stage comprises multiplication by an NXN (i.e., square) symmetric matrix. An NXN weight matrix W (such as a base weight matrix denoted as $W^{(0)}$) may be employed to multiply the symbol vector $X = [X_0 \; X_1 \; \ldots \; X_{N-1}]^T$ before the IFFT. A base discrete-time OFDM signal $x^{(0)} = [x_0 \; x_1 \; \ldots \; x_{N-1}]^T$ is produced by the IFFT for input the data symbols:

$$x^{(0)} = FW^{(0)}X.$$

The weight matrix $W^{(0)}$ employed in the invertible transform 802 can comprise a selective mapping symbol matrix (e.g., a phase-rotation matrix), a transform precoding matrix, any type of spreading matrix, any type of code division multiple access matrix, a MIMO precoding matrix, or any combination thereof.

In some aspects, weight matrix $W^{(0)}$ may be absent. In such aspects, $W^{(0)}$ may be represented mathematically as an NXN Identity matrix I.

The IFFT can comprise an N-point IFFT, wherein each data block input to the IFFT comprises N data symbols. In some aspects, the IFFT is an M-point IFFT (M>N), in which case, the descriptions herein can be adapted accordingly. The IFFT may be configured to provide for zero insertion and/or zero padding. The base discrete-time OFDM signal $x^{(0)}$ output by the invertible transform 802 may be stored in memory 813, such as to be accessed for use in a linear combiner 803.

The symbol vector $X = [X_0 \; X_1 \; \ldots \; X_{N-1}]^T$ may be stored in memory 810 in order to be accessed by a sparse-matrix multiplier 811. An update-matrix generator 815 is configured for generating sparse update matrices as described herein, optionally in response to PAPR measurements and/or control information from a PAPR analyzer 814. The update-matrix generator 815 produces one or more NXN update matrices $W^{(u)}$ (such as indicated by index u, $1 \leq u \leq U$, where U is a total number of updates). The weight set $W^{(1)}$, $W^{(2)}$, ... $W^{(U)}$ may comprise phase-rotation values, for example, such as may be used in selective mapping schemes.

In some aspects, the NXN update matrices $W^{(u)}$ comprise diagonal matrices whose diagonal elements are weights for multiplying symbol vector X to generate a corresponding update symbol vector $X^{(u)}$. The NXN update matrices $W^{(u)}$ can be sparse matrices, meaning that at least one of the weights (e.g., one of the diagonal elements) is zero.

The sparse matrix multiplier 811 can be configured acquire data vector X from memory 810, and thus may be configured for managing I/O operations. The multiplier 811 is configured to multiply a subset of values of data vector X with weights indicated by each of the sparse update matrices $W^{(u)}$. It should be appreciated that matrices $W^{(u)}$ can be indicated as sparse vectors, and the mathematical description herein adapted accordingly. For example, in either case, only values of data vector X corresponding to non-zero weights in $W^{(u)}$ may be updated, and the remaining values of X are set to zero corresponding to the zero values of $W^{(u)}$.

In some aspects, a multiplication of a weight value with an X value may be effected via addition and subtraction to arrive at the equivalent result. For example, matrix multiplier 811 might comprise logic and/or circuits configured to convert a −1 multiplication of symbol value 1 into a subtraction of −2 from symbol value 1. Equivalently, this multiplication may be effected by changing the sign bit corresponding to symbol value 1. Various corresponding bit-level operations may be employed to effect multiplication in the aspects disclosed herein.

The sparse matrix multiplier 811 produces an update data symbol vector $X^{(u)} = W^{(u)}X$, which is input to invertible transform 812. It should be appreciated that the multiplier 811 may comprise a mapper with the same functionality as the mapper 801 and might comprise similar structure. The invertible transform 812 can comprise the same functionality as invertible transform 802 and might comprise the same structure. For example, the same invertible transform circuit might be used to implement 802 and 812, as the invertible transform operation 802 might be performed before the invertible transform operation(s) 812. In some aspects, multiplication, invertible transforms, as well as other functions described herein, may be performed by a single processor configured to implement multithreading, or by a multiprocessor with each processor or core executing a separate thread simultaneously. On a processor or core with hardware threads, separate software threads can be executed concurrently by separate hardware threads. In some aspects, pipelined processor architectures can be employed. In some aspects, virtualized computing platforms may be implemented.

An update discrete-time OFDM signal $x^{(u)} = [x_0^{(u)} \; x_1^{(u)}, \ldots x_{N-1}^{(u)}]^T$ is produced by the invertible transform 812:

$$x^{(u)} = FW^{(u)}X.$$

The linear combiner 803 combines the update discrete-time OFDM signal $x^{(u)}$ with the base discrete-time OFDM signal $x^{(0)}$ to produce an updated discrete-time OFDM signal $y^{(u)}$:

$$y^{(u)} = x^{(0)} + x^{(u)}$$

For example, linear combiner 803 may perform a vector sum on vectors $x^{(0)}$ and $x^{(u)}$.

In one aspect, $x^{(0)}$ is stored in memory 813, and linear combiner 803 retrieves it for each subsequent update (u). In some aspects, $y^{(u)}$ is stored in memory 813 by the linear combiner 803, and it may be designated as the base discrete-time OFDM signal $x^{(0)}$ for a subsequent update(s).

In some aspects, a signal selector 804, which comprises PAPR analyzer 814, selects $y^{(u)}$ to be stored in memory 813, such as if the value $y^{(u)}$ has a corresponding low PAPR and is consequently designated by the signal selector 804 to be used as a base for further PAPR reduction. The signal selector 804 may also store corresponding PAPR measurements and/or PAPR-based metrics in the memory 813.

PAPR analyzer 814 is configured to measure the PAPR of each discrete-time OFDM signal $y^{(u)}$, possibly generating PAPR metrics from such measurements, and then is configured to compare the PAPR measurements (and/or metrics) to PAPR measurements (and/or metrics) corresponding to one or more previous discrete-time OFDM signal. The PAPR analyzer 814 may comprise a decision-processing capability configured to select a "best" discrete-time OFDM signal for further PAPR-reduction processing or to be output for subsequent transmission signal processing. The PAPR analyzer 814 may comprise a weight-adaptation capability configured to adapt the generation or selection of update matrices $W^{(u)}$ produced by the update-matrix generator 815. For example, PAPR analyzer 814 may compare a current PAPR measurement with one or more previous PAPR measurements, determine if there is a possible correlation between certain weight values and PAPR reduction, and then test its hypothesis by adapting the PAPR analyzer 814.

The signal selector 804 might select a set of weights corresponding to the discrete-time OFDM signal with the best PAPR or PAPR-based metric, and then output the set of weights for further processing in a baseband processing circuit. The best PAPR might be a measured or computed PAPR that is below a predetermined threshold value. The best PAPR might be the lowest PAPR from a set of PAPR measurements, wherein the number of PAPR measurements in the set might be predetermined or might be based on a time limit (e.g., a maximum number of clock cycles) for performing the weight selection. In some aspects, the signal selector 804 might output the discrete-time OFDM signal with the best PAPR for further processing in a baseband processing circuit.

Figure 8B:
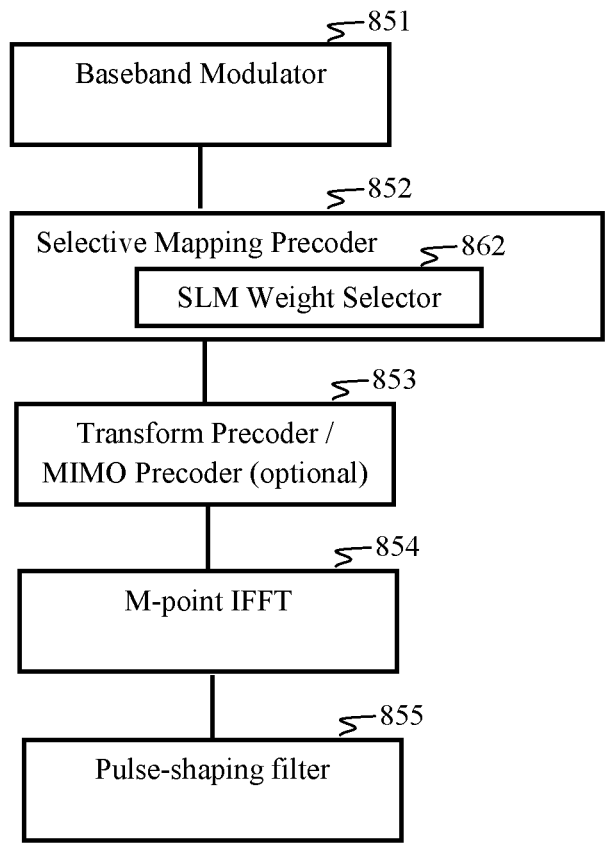
FIG. 8B is a block diagram of a baseband processing apparatus that can be implemented according to aspects of the disclosure. The depicted baseband processing apparatus can be implemented as an integrated circuit, a general-purpose processor programmed as a software-defined radio, and/or a set of discrete hardware components, for example.

FIG. 8B is a block diagram of an exemplary baseband processing apparatus, wherein the block diagram depicted in FIG. 8A may be implemented as an SLM Weight Selector 862. It should be appreciated that the block diagrams shown in the disclosure can represent functional elements of a baseband processing circuit, such as (but not limited to) an ASIC, an FPGA, a software-defined radio programmed to perform the functions disclosed herein, or any combination thereof.

A baseband modulator 851 is coupled to a selective mapping precoder 852, of which SLM Weight Selector 862 may be a component. Optionally, a transform precoder and/or MIMO precoder 853 is coupled between the selective mapping precoder 852 and an M-point IFFT 854. A pulse-shaping filter 855 follows the IFFT 854.

In an exemplary functional aspect, the SLM Weight Selector 862 receives the data stream from the baseband modulator 851 and outputs at least a selected set of weights that provides a "best" discrete-time OFDM signal with respect to PAPR for a given data block (and within certain constraints, such as maximum number of iterations, maximum processing time, or some other constraint(s)). In some aspects, if transform precoding, MIMO precoding, spreading, or some other precoding is employed by the precoder 853, such precoding may be communicated to the SLM Weight Selector 862 such that the precoding might be implemented in the invertible transforms 802 and 812. In some aspects, the SLM Weight Selector 862 outputs SLM-weighted data corresponding to the discrete-time OFDM signal with the lowest PAPR. In some aspects, the SLM Weight Selector 862 outputs the discrete-time OFDM signal with the lowest PAPR.

The selective mapping precoder 852 can employ an SLM codebook and select candidate SLM weight sets therefrom. SLM codebooks, including techniques for generating such codebooks, employing such codebooks, and conveying via a control channel a codebook selection(s), can be implemented in a similar manner as is known in the art for other codebook applications, such as in C. Jiang, et al.; "MIMO Precoding Using Rotating Codebooks"; IEEE Trans. Veh. Tech.; Vol. 60, Issue 3, March 2011; A. Boonkajay, et al.; "2-Step phase rotation estimation for Low-PAPR signal transmission using blind selective mapping"; 2017 IEEE 28th Annual International Symposium Personal Indoor and Mobile Radio Comm. (PIM:RC); pp 1-5, 2017; and M. Sghaier, et al.; "Efficient embedded signaling through Alamaouti STBC precoders in MIMO-OFDM systems"; 2013 IEEE Wireless Comms. And Networking Conf. (WCNC); pp. 4053-4058, 2013; all of which are incorporated by reference in their entireties.

In some aspects, SLM Weight Selector 862 returns a feedback signal, comprising (for example) feedback bits indicative of a selected SLM weight set, to the selective mapping precoder 852.

The precoder 852 is responsive to the feedback signal for selecting the corresponding weight set. Some aspects provide for blind SLM, such as to reduce or eliminate side information. Aspects disclosed herein for reducing or eliminating side information can find further utility in distributed processing networks, such as to minimize control-signaling overhead in networks connecting the processors.

Figure 9:
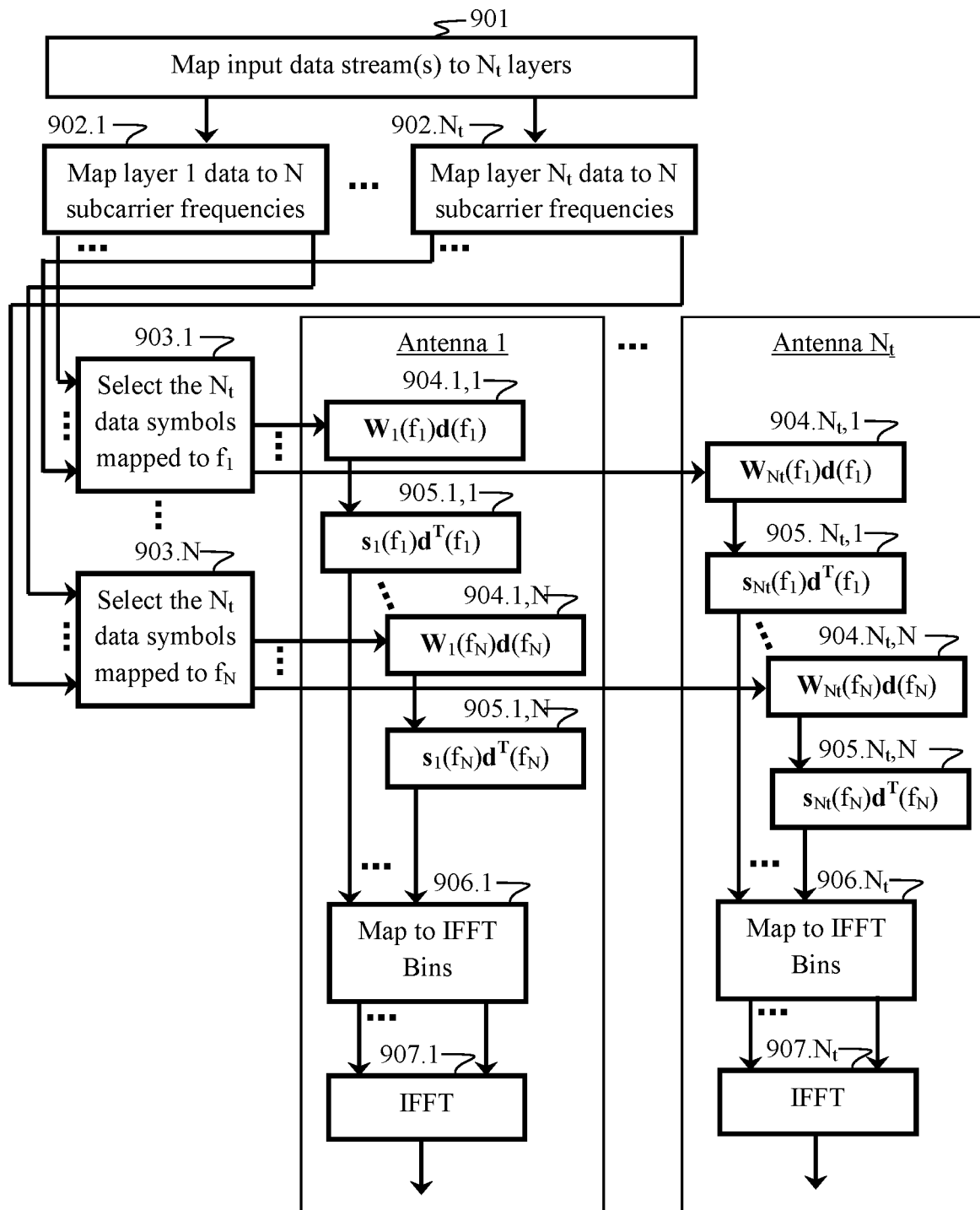
FIG. 9 is a flow diagram that is representative of PAPR-reduction operations in a multi-antenna MIMO system in accordance with some aspects of the disclosure. The MIMO system can comprise any of various types of massive-MIMO, multi-user MIMO (MU-MIMO), server-side distributed antenna systems (e.g., coordinated multipoint, fixed relay, mobile relay), client-side distributed antenna systems, relay networks, mesh networks, peer-to-peer networks, and airborne networks.

FIG. 9 is a flow diagram that is representative of PAPR-reduction operations in a multi-antenna MIMO system in accordance with some aspects of the disclosure. Blocks depicted herein can represent operations performed in a centralized processor or may be distributed across multiple processors, such as in a Cloud computing configuration. In some aspects, the processors may reside on network nodes, such as nodes corresponding to the multiple antennas in a Cooperative-MIMO configuration.

One or more input data streams are mapped to a number $N_t$ of layers 901 corresponding to a plurality of MIMO transmission channels, such as MIMO subspace channels. Data in each layer $1-N_t$ is mapped to a plurality N of OFDM subcarrier frequencies 902.1-902.$N_t$, such as in accordance with scheduling information that assigns N subcarriers to a transmitter. The mapping 902.1-902.$N_t$ can comprise partitioning the data symbols into blocks of size N. Thus, mapping 902.1-902.$N_t$ can produce a set of $N_t$ blocks, each with size N. A data selection process 903.1-903.N provides for selecting a set of $N_t$ data symbols corresponding to each frequency, $f_1$ to $f_N$. For each frequency $f_1$ to $f_N$, a corresponding data symbol is collected from each of the aforementioned $N_t$ blocks. Data symbols arranged in each process 903.1-903.N can be formatted into N blocks of size $N_t$.

A block of $N_t$ data symbols $d(f_1)$ corresponding to frequency $f_1$ is configured for processing for each of the $N_t$ antennas (e.g., shown as Antenna 1-Antenna $N_t$). This is performed for each frequency up to $f_N$. For simplicity, it is assumed that the number of transmit antennas equals the number of layers. However, aspects disclosed herein can be adapted for different antenna configurations, such as wherein the number of antennas is greater than $N_t$.

Processing for Antenna 1 can comprise applying a PAPR-reduction weight matrix (which may comprise a phase rotation sequence) to each of the data blocks $d(f_1)$-$d(f_N)$ 904.1,1-904.1,N-904.$N_t$,1-904.$N_t$,N. Weight matrices $W_1(f_1)$-$W_1(f_N)$ can be employed for Antenna 1, and $W_{Nt}(f_1)$-$W_{Nt}(f_N)$ can be employed for Antenna $N_t$. For simplicity of notation, each data block resulting from the product of a weight matrix $W_j(f_n)$ (indexed by antenna (j) and frequency (n)) with a data symbol block $d(f_n)$ 904.1,1-904.1,N-904.$N_t$,1-904.$N_t$,N is also denoted as $d(f_n)$.

Each data symbol block $d(f_n)$ corresponding to each antenna (1 to $N_t$) is multiplied by a MIMO precoding vector $s_j(f_n)$ indexed by antenna (j) and frequency (n) 905.1,1-905.1,N-905.$N_t$,1-905.$N_t$,N to produce a corresponding precoded symbol value. Thus, for each antenna, N precoded symbol values are produced that correspond to a set of N symbol blocks $d(f_n)$, $n=1, \ldots, N$, of size $N_r$. Each of the N precoded symbol values comprises a linear combination of the $N_t$ data symbols of the block $d(f_n)$ of the corresponding subcarrier frequency $f_n$. The N precoded symbol values for each antenna are mapped 906.1-906.$N_t$, to input bins of a set of IFFTs 907.1-907.$N_t$. The IFFTs 907.1-907.$N_t$ generate a discrete-time MIMO-OFDM signal for each of the antennas 1-$N_t$.

Figure 10:
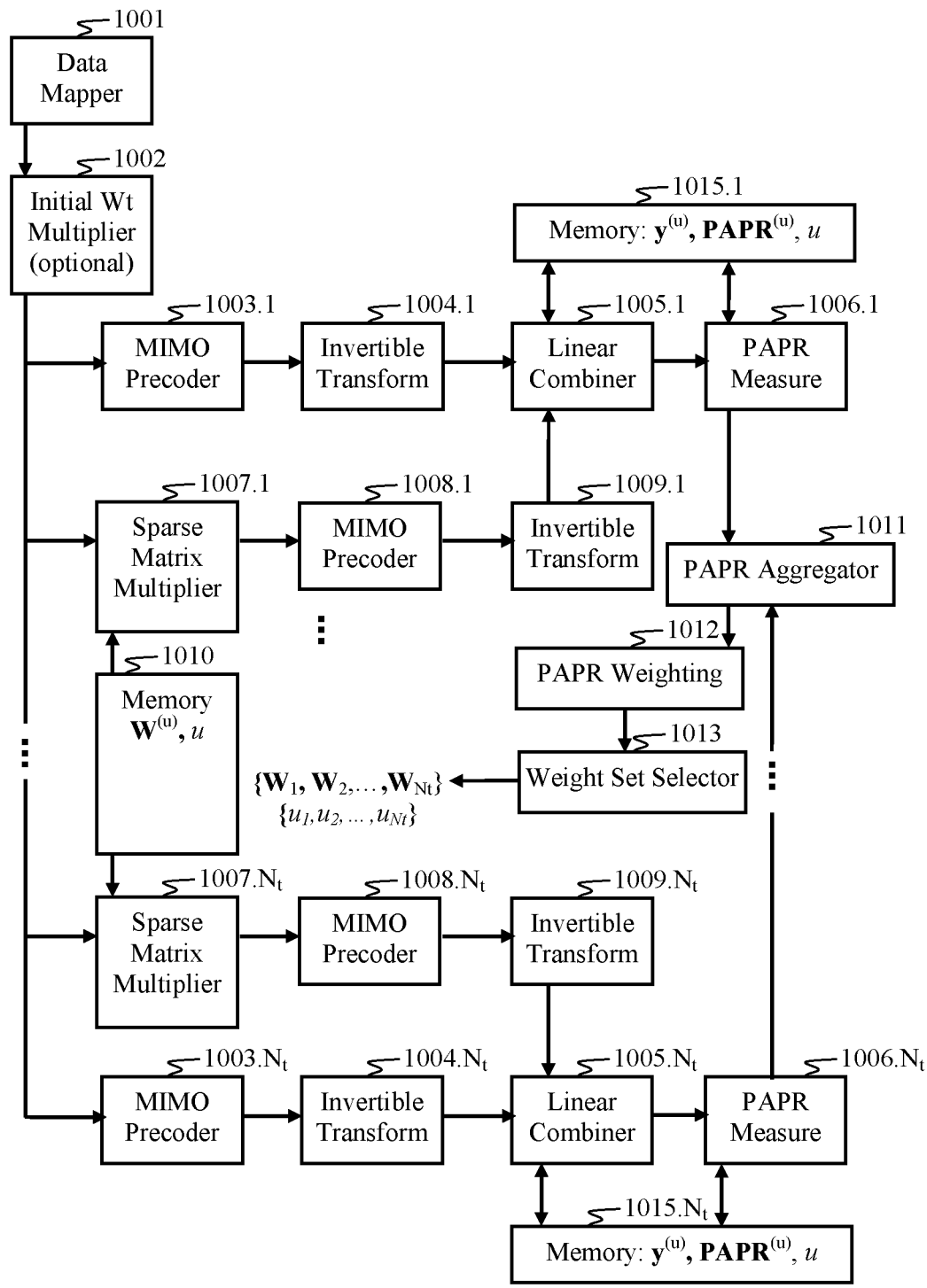
FIG. 10 is a block diagram depicting method and apparatus implementations for PAPR-reduction weight selection in a MIMO-OFDM system.

In accordance with some aspects of the disclosure, selection of the weight matrices $W_j(f_n)$ in FIG. 9 is explained with reference to the block diagram illustrated in FIG. 10. Aspects disclosed herein can be configured for centralized processing in a massive-MIMO antenna array, centralized processing in a distributed antenna system, distributed processing in a distributed antenna system, and any combination thereof. In one aspect, distributed processors employed herein comprise a Cloud computing network, such as may comprise selectable processors distributed across machines in a rack, machines in multiple racks, and/or machines residing in multiple geographically distributed data centers. The Cloud computing network can comprise a Cloud storage network, which can be distributed across machines in a rack, machines in different racks, and/or machines in different data centers. Included in the Cloud computing network in accordance with some aspects of the disclosure are selectable and/or configurable network resources, including switches, routers, access points, gateways, and the like. Such selectable and/or configurable network resources can provide for selectable and configurable access to backhaul networks. Such selectable and configurable access can comprise selectable bandwidth, selectable latency, selectable quality of service, and the like. The Cloud computing network may comprise cooperating wireless devices functioning as antennas as well as distributed processors in a Cooperative-MIMO system. Each of the cooperating wireless devices may comprise processing resources (which can include Cloud storage and virtual networking resources) and may be configured to perform at least some of the PAPR-reduction operations disclosed herein.

A data mapper 1001 can map one or more input data streams to resource blocks and layers. Optionally, data may be processed by a multiplier 1002 configured to multiply the data with one or more weights. The weights might comprise an initial weight set $W^{(0)}$, for example. Multiplier 1002 might be configured to scramble the data, spread the data with any type of spreading code and/or multiple access code, perform any type of transform precoding (such as SC-FDMA precoding), or provide for any combination thereof. Data symbols output by the mapper 1001 or the multiplier 1002 are input to a plurality $N_t$ of processing branches wherein each branch corresponds to one of the $N_t$ antennas, for example. The processing branches can be implemented in a serial or parallel architecture of processors, or combinations thereof. The processing branches may employ a centralized processor, a distributed set of processors, or any combination thereof.

A first branch comprises a first path (e.g., MIMO precoder 1003.1 and Invertible transform 1004.1) that generates an initial or base discrete-time MIMO-OFDM signal, and a second path (e.g., Sparse Matrix Multiplier 1007.1, MIMO precoder 1008.1, and Invertible Transform 1009.1) that generates a plurality U of update discrete-time MIMO-OFDM signals to added to the base discrete-time MIMO-OFDM signal in a linear combiner 1005.1. The resulting combined discrete-time MIMO-OFDM signal output from the linear combiner 1005.1 is analyzed in a PAPR measurement module 1006.1 to measure the signal's PAPR.

An $N_t^{th}$ branch comprises a first path (e.g., MIMO precoder 1003.$N_t$ and Invertible transform 1004.$N_t$) that generates an initial or base discrete-time MIMO-OFDM signal, and a second path (e.g., Sparse Matrix Multiplier 1007.$N_t$, MIMO precoder 1008.$N_t$, and Invertible Transform 1009.$N_t$) that generates a plurality U of update discrete-time MIMO-OFDM signals to added to the base discrete-time MIMO-OFDM signal in a linear combiner 1005.$N_t$. The resulting combined discrete-time MIMO-OFDM signal output from the linear combiner 1005.$N_t$ is analyzed in a PAPR measurement module 1006.$N_t$ to measure the signal's PAPR.

With respect to each branch, a description of the first branch is provided herein for simplicity. MIMO precoder 1003.1 and 1008.1 can employ MIMO precoding weights (such as spatial multiplexing weights, diversity combining weights, SVD weights, STBC weights, and the like), that may be previously generated and stored in a memory. For example, MIMO precoding weights might be generated from CSI derived from measurements of pilot signals. The MIMO precoder 1003.1 and 1008.1 might read the MIMO precoding values from the memory and perform weighting (e.g., via matrix multiplication) with the input data symbols. The MIMO precoder 1003.1 and 1008.1 might comprise I/O circuitry and/or a processor programmed to interface with the memory to read the precoding weights and circuits or a processor configured to perform matrix multiplication between an input data matrix (e.g., a vector) and a precoding weight matrix (e.g., a vector) to generate precoded data symbols. In some aspects, MIMO precoder 1003.1 and 1008.1 might be implemented with circuitry common to both precoders configured to separately or concurrently perform the operations corresponding to each MIMO precoder 1003.1 and 1008.1. Similarly, Invertible Transforms 1004.1 and 1009.1 may be implemented with a single invertible transform circuit or a single general-purpose processor programmed to perform an IFFT (for example).

Sparse Matrix Multiplier 1007.1 is configured to multiply each input data set with a sparse update weight matrix $W^{(u)}$, such as may be stored in a memory 1010. It should be appreciated that in some aspects, the sparse update weight matrix $W^{(u)}$ can be an SLM matrix (such as a phase-rotation matrix). In other aspects, the update weight matrix $W^{(u)}$ can be configured to effect dummy symbol insertion, such as into one or more predetermined OFDM resource blocks and/or layers. Dummy symbol insertion may be effected by employing subchannels that are assigned for PAPR-reduction signaling rather than communications, including spatial subchannels (which can include a signal space projection that is orthogonal to the signal space employed for communications). In some aspects, the update weight matrix $W^{(u)}$ can effect scheduling permutations of the data symbols to resource blocks and/or layers. Multiplier 1007.1 might comprise I/O circuitry and/or a processor programmed to interface with the memory 1010 to read the weights $W^{(u)}$, and circuits or a processor configured to perform matrix multiplication between an input data matrix (e.g., a vector) and each weight matrix $W^{(u)}$. Each weight matrix $W^{(u)}$ may be stored in the memory 1010 with a corresponding index u as part of a weight codebook, and the index u might be communicated with other devices to identify a particular weight matrix $W^{(u)}$. In some aspects, the codebook comprises each update weight matrix $W^{(u)}$. In some aspects, the codebook stores a base matrix $W^{(0)}$ and matrices equal to the base matrix $W^{(0)}$ summed with each update weight matrix $W^{(u)}$. In some aspects, the codebook stores a set of matrices wherein for index u, the corresponding matrix equals the sum of update weight matrix $W^{(u)}$ with a previous base matrix. In some aspects, Multiplier 1007.1 is programmatically and/or electronically incorporated into the MIMO precoder 1008.1.

The linear combiner 1005.1 combines each ($u^{th}$) update discrete-time MIMO-OFDM signal with a base discrete-time MIMO-OFDM signal to generate an updated discrete-time MIMO-OFDM signal, which is processed by PAPR measurement module 1006.1. The linear combiner 1005.1 can comprise I/O circuitry configured to write a base discrete-time MIMO-OFDM signal to memory 1015.1 and read the base discrete-time MIMO-OFDM signal from memory 1015.1, such as to sum it with an update discrete-time MIMO-OFDM signal. In one aspect, the linear combiner 1005.1 stores the discrete-time MIMO-OFDM signal output from invertible transform 1004.1 and employs this signal as the base discrete-time MIMO-OFDM signal for one or more subsequent updates. In some aspects, the linear combiner 1005.1 stores an updated discrete-time MIMO-OFDM signal and employs this signal as the base signal in one or more subsequent updates. In some aspects, PAPR measurement module 1006.1 stores an updated discrete-time MIMO-OFDM signal in the memory 1015, such as in response to comparing its PAPR measurement to a previous PAPR measurement or some threshold value. The PAPR measurement module 1006.1 might designate this updated discrete-time MIMO-OFDM signal as a base signal to be used by the linear combiner 1005.1 in one or more subsequent updates. The base discrete-time MIMO-OFDM signal and the update discrete-time MIMO-OFDM signal may comprise vectors, and the linear combiner 1005.1 can comprise a circuit or programmatically configured general-purpose processor to perform vector addition to compute the updated discrete-time MIMO-OFDM signal.

Module 1006.1 can comprise an envelope detector circuit configured to perform peak amplitude detection of discrete-time MIMO-OFDM signals, and can be configured to compute from measurements of each discrete-time MIMO-OFDM signal, a PAPR. Module 1006.1 can comprise a digital signal sampler configured to collect samples of an input discrete-time MIMO-OFDM signal. A circuit or programmed processor can be configured to calculate the PAPR from samples. In some aspects, each discrete-time MIMO-OFDM signal processed by the module 1006.1 comprises a symbol vector (or is processed to generate a symbol vector, such as via sampling), and the symbol vector is processed using mathematical functions to compute the maximum and the average vector values to produce a PAPR. The module 1006.1 can comprise I/O circuitry or can be programmatically configured to write and read values from the memory 1015.1. By way of example, the module 1006.1 might write a PAPR measurement to the memory to be compared with PAPR computed from a subsequent updated discrete-time MIMO-OFDM signal. Module 1006.1 might read a PAPR from the memory 1015.1 to compare to a current PAPR measurement. The module 1006.1 might write an updated discrete-time MIMO-OFDM signal vector to memory 1015.1 to be used by the linear combiner in a subsequent update. The module 1006.1 might write a weight index u corresponding to a best PAPR measurement to the memory 1015.1.

Stored values, such as u and its corresponding $PAPR^{(u)}$, can be read from the memory 1015.1 by the module 1006.1 and communicated to a PAPR aggregator 1011 configured to collect PAPR and weight index values (and possibly other data) from the $N_t$ branches. By way of example, each branch's module 1006.1-1006.$N_t$ might communicate all U PAPR measurements to the aggregator 1011.

A PAPR weighting module 1012 may optionally be provided and may be configured to multiply a weight value to each PAPR value corresponding to the branch from which it was received. The weighted PAPR values are then processed in a weight selector 1013, which can select a best weight set for use by all the branches. For example, for each index u, weight selector 1013 can sum the corresponding weighted PAPR values from all the branches to generate an aggregate power-efficiency metric. The best weight set index ($0 \leq u \leq U$) can be selected from the corresponding aggregate power-efficiency metric with the smallest value. The best weight set index (or the corresponding weights) can be communicated by the weight set selector 1013 to processing branches for each antenna (such as shown in FIG. 9) and implemented in weighting processes 904.1,1-904.1,N-904.$N_t$,1-904.$N_t$,N.

Each branch weight might be stored in corresponding branch memory 1015.1-1015.$N_t$ and communicated by each corresponding module 1006.1-1006.$N_t$ to the PAPR weighting module 1012. Alternatively, the PAPR weighting module 1012 might compute one or more of the branch weights. In one aspect, each branch weight comprises a measure of the branch antenna's (or corresponding network node's) sensitivity to PAPR. For example, a high branch weight can correspond to a high sensitivity, whereas a low branch weight can correspond to a low sensitivity. A branch that corresponds to a battery-powered node typically has a higher branch weight than a branch that corresponds to a node with line power, since power efficiency is likely more critical to the operation of a battery-powered device. Thus, some aspects of the disclosure are configured to schedule one or more line-powered nodes to a set of battery-powered nodes in a distributed MIMO antenna array. This can provide for additional degrees of freedom, which enables weight selection 1013 to provide lower PAPR for PAPR-sensitive nodes by sacrificing low PAPR for nodes that are not as PAPR-sensitive. In some aspects, PAPR weighting module 1012 might compute one or more of the branch weights based on each corresponding node's battery life reported to the module 1012. Devices with little remaining battery life can be provided with higher corresponding branch weights than devices with nearly full battery life, for example. The PAPR weighting module 1012 might compute the branch weights based on a power-scaling factor assigned to each device (e.g., devices transmitting with higher power might have higher corresponding branch weights), a session duration assigned to each device (e.g., devices that are scheduled or otherwise expected to have a longer session, such as based on their type of data service or the file size they are transmitting, might have higher corresponding branch weights), a priority level (such as based on emergency or non-emergency links), a subscription level, or some other metric(s), or combination thereof.

Figure 11A:
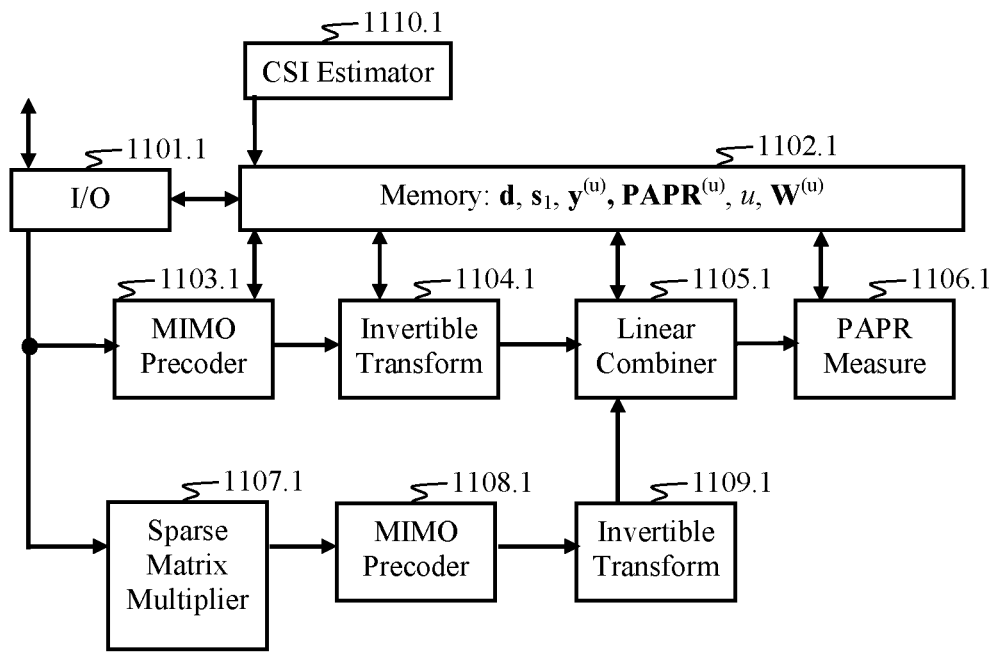
FIG. 11A is a block diagram of a weight-selection module configured in accordance with method and apparatus aspects disclosed herein.

FIG. 11A is a block diagram of a weight-selection module that comprises one branch of a set of $N_t$ branches in a PAPR-reduction weighting network. The weight-selection module may be part of a network node's transceiver, wherein the network node is configured to operate cooperatively with at least one other network node in a distributed antenna system. For simplicity of explanation, in this aspect, the node is one of $N_t$ nodes in an $N_t$-element MIMO antenna array. It should be appreciated that aspects disclosed herein can be adapted to systems in which one or more of the nodes comprises multiple antennas. In some aspects, the weight-selection module is effected functionally in a Cloud-computing network. One or more processing cores may perform the functions disclosed with respect to the weight-selection module, wherein the one or more processing cores are geographically remote from the node.

In one aspect, one node may perform one or more of the weight-selection module's processing operations for at least one other node. It should be appreciated that any of the devices disclosed herein, such as the weight-selection module, can be implemented in a virtual machine, and the virtual machine may dynamically provision processing cores, memory, network devices (e.g., switches, routers, gateways, access points, hubs, multi-homed computers (or other types of computing devices configurable for routing traffic)), and network services to meet the corresponding functional requirements.

The nodes may collaborate to perform software-defined networking. For example, a set of cooperating nodes may provision a distributed firewall. In one aspect, the nodes employ a distributed-firewall program which configures network interface devices in a distributed network to provision an application-specific firewall. An exemplary application-specific firewall would filter network traffic to allow traffic that meets predetermined criteria to reach the application and block other traffic. A firewall program for distributed weight selection (such as depicted in FIG. 11A) can control I/O processor 1101.1. The firewall program may communicate with firewall programs on other nodes, authenticate those nodes, and authenticate transmissions from those nodes. Thus, the firewall program may white-list only those nodes which have data that the resident weight-selection application might use. Furthermore, the firewall program might perform deep packet inspection at the I/O 1101.1, such as to locate, identify, classify, reroute, and/or block packets with specific data or code payloads. For example, only received packets containing the data vector d and MIMO precoding weights $s_1$ might be allowed to reach the weight-selection application. The firewall program might forward packets containing information intended for other nodes. When components (e.g., any of the blocks 1102.1-1110.1) of the weight-selection application shown in FIG. 11A are distributed across multiple devices, each block or set of blocks residing on any particular device 1102.1-1110.1 might comprise a corresponding I/O processor and firewall program.

The node comprises I/O circuitry 1101.1 for communicating with at least one other node. In one aspect, the node can comprise one of a set of (mobile and/or fixed) relay nodes configured for either or both uplink and downlink communications in a RAN. In one aspect, the node can comprise one of a set of base transceiver terminals (such as remote radio heads, small-cell base stations, wireless access points, and the like) configured to function as a server-side distributed antenna system. In one aspect, the node can comprise one of a set of mobile radio devices configured operate together as a client-side distributed antenna system. In one aspect, the node can comprise one of a set of devices comprising any combination of relay nodes, server-side nodes, and client-side nodes configured to operate together as a distributed antenna system. The I/O circuitry 1101.1 can comprise one or more communication transceivers, including wireless (e.g., radio, optical, or some other wireless technology) transceivers and wired (e.g., cable, fiber, or some other wire-line technology) transceivers.

At least one memory 1102.1 is communicatively coupled to at least one processor in the node for storing data and programs. The I/O 1101.1 can comprise a processor configured for writing data received from other nodes to the memory 1102.1 and reading data from the memory 1102.1 to be transmitted to at least one other node. By way of example, a CSI estimator 1110.1 may be provided to measure received RAN (e.g., WWAN) pilot signals (such as received from the I/O circuitry) and estimate CSI therefrom. The CSI may be stored in the memory 1102.1 and transmitted to at least one other node via the I/O circuitry 1101.1.

MIMO precoding weights are computed from the CSI, possibly remotely by a MIMO subspace processor (not shown). MIMO precoding weights received by the node are written to the memory 1102.1 by the I/O 1101.1. MIMO Precoder 1103.1 and 1108.1 read the MIMO precoding weights from the memory 1102.1. Data symbols to be transmitted by the node can be received by the I/O from at least one other network node and written to the memory 1102.1. MIMO Precoder 1103.1 reads the data symbols and the MIMO precoding weights from the memory 1102.1. The memory 1102.1 can further comprise update weight matrix data, such as a set of update weight matrices $W^{(u)}$, each indexed by update index u. Sparse matrix Multiplier 1107.1 reads the data and an update weight matrix from the memory for each iteration. The discrete-time MIMO-OFDM signals generated by either or both invertible transforms 1104.1 and 1109.1 may optionally be stored in the memory 1102.1 for subsequent processing. In one aspect, the initial (u=0) iteration includes writing the base discrete-time MIMO-OFDM signal to the memory 1102.1. Linear combiner 1105.1 can read the base discrete-time MIMO-OFDM signal from memory 1102.1 and combine it with an update discrete-time MIMO-OFDM signal generated by invertible transform 1109.1. The linear combiner 1105.1 might store the resulting sum (i.e., the updated discrete-time MIMO-OFDM signal) in the memory 1102.1 for subsequent use by the linear combiner 1105.1 and/or PAPR measurement module 1106.1. The module 1106.1 might read a previous PAPR measurement or a threshold value from the memory 1102.1, compare its current PAPR measurement of the updated discrete-time MIMO-OFDM signal from the linear combiner 1105.1 to the read value, and possibly write a new PAPR value (and, optionally, the corresponding index u) to the memory 1102.1. Upon completion of or more of the iterations, the I/O 1101.1 may read the PAPR(s) and corresponding indices u from memory 1102.1 and transmit it to at least one other node for PAPR aggregation, analysis, and weight selection. The node disclosed in accordance with FIG. 11A may comprise a single processor, a multiprocessor, and/or a virtual machine configured to perform the processes associated with blocks 1101.1, 1103.1, 1104.1, 1105.1, 1106.1, 1107.1, 1108.1, and 1109.1. In some aspects, one or more of the aforementioned blocks 1101.1-1109.1 may be implemented on multiple processors, at least some of which may geographically distributed, such as in a Cloud configuration.

Figure 11B:
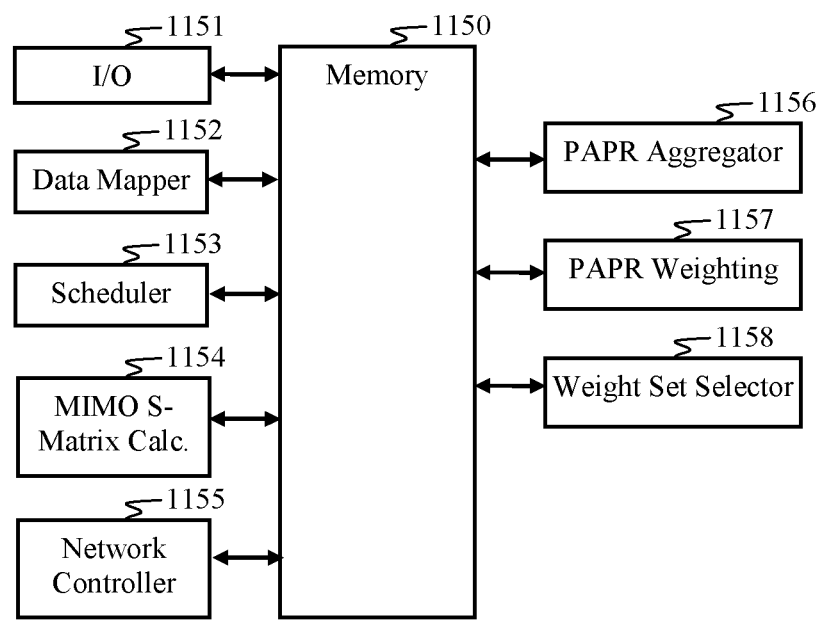
FIG. 11B is a block diagram of a central-processing node and associated functionality, wherein the central-processing node is configured to be communicatively coupled to a plurality of nodes that perform weight selection.

FIG. 11B is a block diagram of a central-processing node configured to be communicatively coupled to a plurality of nodes, such as nodes configured in accordance with the illustration and corresponding disclosure of FIG. 11A. The node depicted in FIG. 11B may be a client-side node, a relay node, or a server-side node. One or more of the functional blocks 1150-1158 might be implemented on at least one other node. In some aspects, the implementation of the node in FIG. 11B is actualized with a networked group of cooperating nodes. One or more of the functional blocks 1150-1158 might comprise virtual resources (e.g., virtual machines, virtual network devices, etc.). The functional blocks 1150-1158 might be implemented via Cloud computing and Cloud storage. The node depicted in FIG. 11B may comprise a single processor, a multiprocessor, and/or a virtual machine configured to perform the processes associated with blocks 1150-1158.

An I/O processor 1151 communicatively couples to a plurality of network nodes, such as the node depicted in FIG. 11A. The I/O processor 1151 can comprise wireless local area network (WLAN) radio transceiver circuitry (such as a baseband chipset or SDR, RF circuitry, one or more antennas, etc.) configured for employing a WLAN to communicate user plane and control plane information with and between the other network nodes. In such aspects, a network controller 1155 (which may reside on this node and/or on at least one other node) can perform WLAN control and management functions, such as (but not limited to) network access control, scheduling, resource management, routing, authentication, security, and the like. It should be appreciated that I/O 1151 and 1155 can be configured for an optical WLAN to communicatively couple the nodes.

The network controller 1155 may comprise Cooperative-MIMO functionality to select and coordinate nodes in a WLAN (e.g., a "local" group) to perform collaborative RAN functions. For example, the network controller 1155 may adapt a distributed antenna system by selecting/de-selecting nodes. Adaptation of the distributed antenna system might be responsive to CSI, MIMO condition number (and/or some other quality metric of spatial subchannels in a MIMO system), node mobility, node location, node availability, QoS measurements, RAN scheduling, data buffer size, etc. The network controller 1155 may select a set of nodes for the local group to include at least one node with little or no PAPR sensitivity. The network controller 1155 might be configured to select distributed processing resources to perform signal-processing operations disclosed herein, such as PAPR measurements, weight selection, MIMO processing, and the like.

The I/O 1151 may comprise an optical fiber network transceiver for communicatively coupling to the other node(s). Specifically the I/O 1151 can comprise any appropriate transceiver circuitry for communicatively coupling to the other node(s). The I/O 1151 can comprise a RAN transceiver. For example, the node depicted in FIG. 11B might be a RAN base transceiver station configured to cooperatively transmit and/or receive RAN signals in a distributed antenna configuration with at least one other RAN base transceiver station.

The I/O 1151 may comprise a backhaul transceiver configured for providing backhaul network connectivity. For example, a backhaul transceiver might connect to a packet core network, the Internet, a network fabric, or the like. In some aspects, the backhaul transceiver might allow the node to communicate with other nodes (such as the node depicted in FIG. 11A) and might connect the other nodes with remote processing resources (e.g., a data center). In some aspects, the backhaul transceiver provides a connection to remote processing resources (such as Cloud computing resources), which can perform any of the functions in the blocks 1152-1158, for example. In such aspects, the network controller 1155 might measure backhaul links for at least one of latency, QoS, and data bandwidth. The network controller 1155 might compare the measurement(s) to at least one threshold value, wherein each threshold value is a suitability threshold for at least one processing operation. For example, MIMO matrix calculation can tolerate a 20 ms latency in some situations, so the threshold value for MIMO matrix calculation might comprise 20 ms minus an estimated processing time minus an estimated delay due to a candidate server's input data backlog. The threshold values can be configured for each of a plurality of candidate servers (including virtual machines) to comprise some measure of the server's processing speed (including any bus delays) and data backlog (e.g., queue or buffer backlog). The network controller 1155 might select a candidate server if the latency measurement is less than the threshold value. The network controller 1155 might select a candidate server with the overall lowest latency. The network controller 1155 might update the threshold periodically and/or as server backlogs change. The network controller 1155 might continuously or periodically monitor the total latency measured from the time that data is sent to a server for processing and when the processed data is returned, and may adapt the server selection(s) to maintain sufficient performance as network and server loads change.

A data mapper 1152 maps RAN data to OFDM resource blocks and layers. This mapping may be communicated to the other nodes. The data mapper 1152 may further provide for data mapping to resource blocks employed in a WLAN to communicate with other nodes.

In one aspect, scheduler 1153 provides for scheduling OFDM resource blocks in the RAN, and this scheduling information may be used by the data mapper 1152 for mapping the data to OFDM resource blocks and layers in the RAN. In another aspect, such as in a relay or client device, the scheduler 1153 receives scheduling information from the BTS(s) in the RAN. Similarly, the scheduling information may be used by the data mapper 1152 for mapping the data to OFDM resource blocks and layers in the RAN. The scheduler 1153 might operate with the network controller 1155 to provide for scheduling resource blocks in the WLAN. The scheduler 1153 might operate with the MIMO S-Matrix Calculation processor 1154 to schedule processing operations to other network nodes.

A PAPR Aggregator 1156 is configured to collect PAPR measurements (and corresponding weight indices, u) from each of the nodes. PAPR Weighting processor 1157 is optionally provided for scaling each PAPR measurement with an antenna- (or node-) specific weight. Such weights might be stored in memory 1150 for each node and/or may be communicated to the central processing node by the other nodes. A weight-set selector 1158 selects the set of PAPR-reduction weights that provides the best overall PAPR performance, which may comprise a weighted PAPR performance measure. The index u corresponding to the best overall PAPR performance is then transmitted to the nodes, and the nodes employ the corresponding weight set $W^{(u)}$ on their data.

Figure 12:
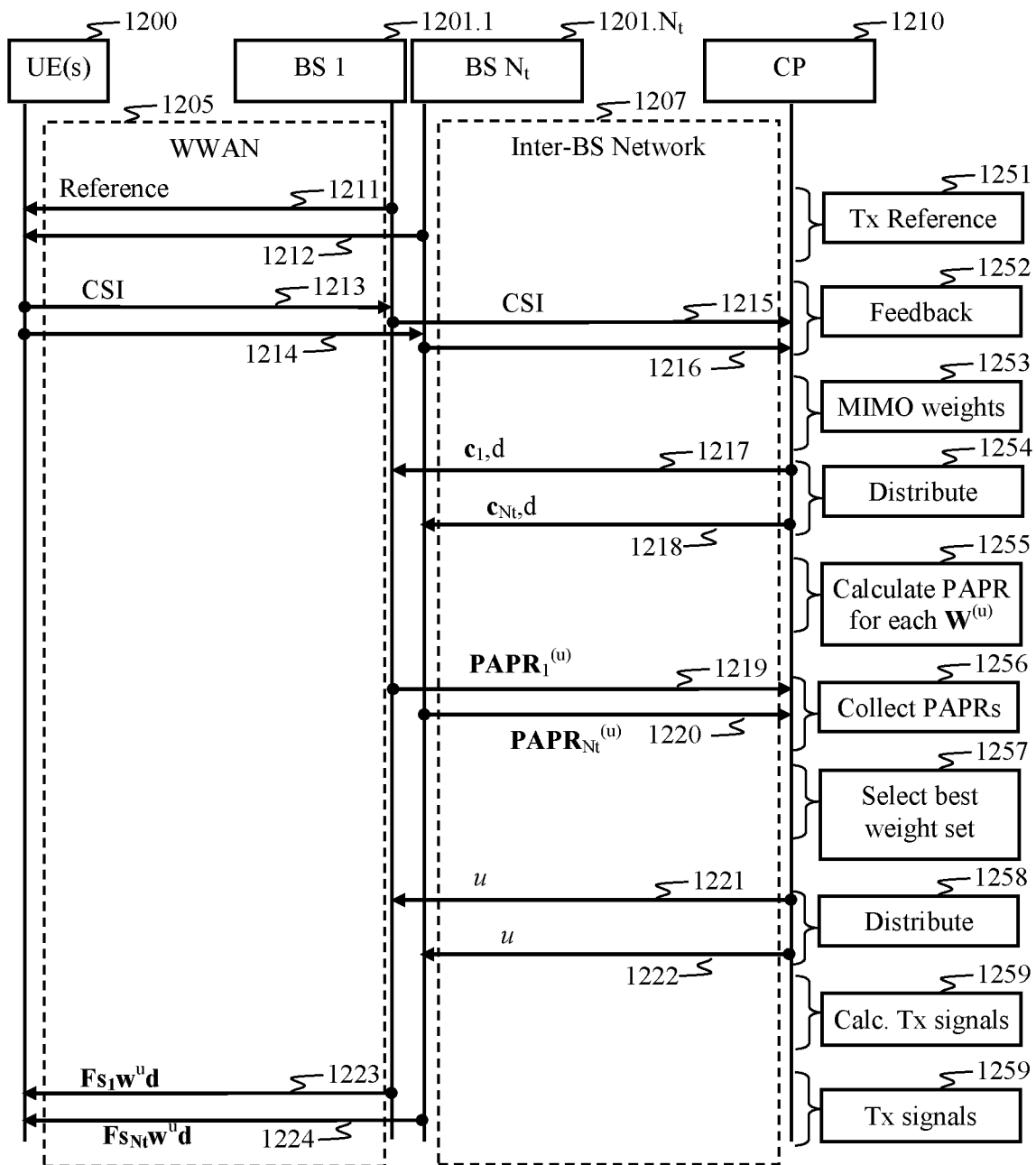
FIG. 12 is a flow diagram that shows a method and corresponding signaling in a distributed antenna system configured to operate in accordance with some aspects of the disclosure.

FIG. 12 is a flow diagram that shows a method and corresponding signaling in a distributed antenna system configured to operate in accordance with some aspects of the disclosure. A set of $N_t$ base transceiver station antennas 1201.1-1201.$N_t$ is shown communicatively coupled by an inter-base station network 1207 (e.g., a local area network) to a central processing node 1210. The base transceiver station antennas 1201.1-1201.$N_t$ serve one or more UEs 1200 via a RAN (e.g., WWAN 1205). For simplicity, each base transceiver station antenna 1201.1-1201.$N_t$ is shown as a network node. In other aspects, one or more base transceiver stations comprise multiple ones of the $N_t$ antennas, and the description herein can be adapted accordingly. In another aspect, a set of UEs can take the place of one or more of the base transceiver station antennas 1201.1-1201.$N_t$. At least one UE, at least one base transceiver station, at least one relay, and/or one or more remote computer processor may be employed as the central processor 1210.

The UE(s) 1200 and/or one or more base transceiver stations and/or relays may be served by the WWAN 1205. In another aspect, one or more relays are employed in place of one or more of the base transceiver station antennas $1201.1$-$1201.N_t$.

The base transceiver stations $1201.1$-$1201.N_t$ transmit reference signals 1211-1212 (such as pilot tones) 1251 which the UE(s) 1200 can measure to determine CSI. In some aspects, CSI 1213-1214 measured by the UE(s) is transmitted back 1252 to the base transceiver stations $1201.1$-$1201.N_t$. In other aspects, the base transceiver stations $1201.1$-$1201.N_t$ measure CSI from reference signals transmitted by the UE(s) 1200. The CSI 1215-1216 is transmitted 1252 via network 1207 to the central processor 1210, which calculates MIMO weights 1253 therefrom. The central processor 1210 transmits 1254 the MIMO weights $c_1$-$c_{Nt}$ and data symbols 1217-1218 to the base transceiver stations $1201.1$-$1201.N_t$. Each base transceiver station $1201.1$-$1201.N_t$ employs a codebook for selecting candidate PAPR-reduction weights and calculates a PAPR 1255 for a discrete-time MIMO-OFDM signal generated from the data, spreading code, and each candidate weight set. Each weight set in the codebook can correspond to a unique codebook index, u. The base transceiver stations $1201.1$-$1201.N_t$ can be configured to employ partial update sparse weight matrices according to methods disclosed herein. Each base transceiver station $1201.1$-$1201.N_t$ transmits its PAPR measurements 1219-1220 to the central processor 1210, which collects 1256 the PAPR measurements for all the base transceiver stations $1201.1$-$1201.N_t$. The central processor 1210 might group the PAPR measurements by codebook index u and may scale the PAPR measurements by antenna-specific and/or node-specific weights. The central processor 1210 selects the best weight set 1257 based on the received PAPR measurements 1219-1220 and transmits 1258 a codebook index u corresponding to the best weight set to the base transceiver stations $1201.1$-$1201.N_t$. Each of the base transceiver stations $1201.1$-$1201.N_t$ generate 1259 RAN transmission signals from the data symbols, the MIMO weights, and the PAPR-reduction weights $w^u$ corresponding to codebook index u.

In one aspect, the central processor 1210 determines which available nodes will function as a distributed antenna system, and it sends notification signals to selected ones of the nodes $1201.1$-$1201.N_t$. A network controller 1155 can perform polling, paging, and scheduling operations for the WLAN 1207 to ensure that nodes $1201.1$-$1201.N_t$ are available and are provided with sufficient WLAN communication resources. The central processor 1210 can provision the set of nodes $1201.1$-$1201.N_t$ such that at least one of the selected nodes $1201.1$-$1201.N_t$ comprises a non-PAPR-sensitive node, such as a node with line-power, to be included with a set of battery-powered nodes. The central processor 1210 can designate a low PAPR weight to the at least one non-PAPR-sensitive node, which consequently can enable the weight selection 1257 to effect improved overall PAPR performance among the nodes $1201.1$-$1201.N_t$.

The various blocks shown in the figures may be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the invention may be practiced in various components such as integrated circuit chips and modules, and that the exemplary aspects of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary aspects of this invention.

Various modifications and adaptations to the foregoing exemplary aspects of this invention may become apparent to those skilled in the relevant arts in view of the foregoing description, when read in conjunction with the accompanying drawings. However, any and all modifications will still fall within the scope of the non-limiting and exemplary aspects of this invention.

The invention claimed is:

1. An apparatus configured to be communicatively coupled to an antenna array in a radio access network (RAN), the apparatus comprising:
   a baseband unit, comprising one or more processors communicatively coupled with at least one memory; and
   a fronthaul transceiver configured to communicatively couple the baseband unit to the antenna array via a fronthaul network;
   wherein the baseband unit is configured to:
      for a first set of antennas in the antenna array, generate a first Multiple Input Multiple Output (MIMO) matrix from channel state information (CSI);
      compute a sparse update matrix corresponding to an update to the first set of antennas;
      sum the sparse update matrix with the first MIMO matrix to produce a second MIMO matrix corresponding to a second set of antennas in the antenna array, the second set of antennas being different from the first set of antennas;
      make a determination of which of the first MIMO matrix and the second MIMO matrix results in a better CSI, MIMO condition number, peak-to-average-power ratio, or quality metric of spatial subchannels; and
      based on the determination, configure the first set of antennas or the second set of antennas to transmit or receive signals in the RAN.

2. The apparatus of claim 1, wherein the baseband unit is a virtualized baseband unit.

3. The apparatus of claim 1, wherein the baseband unit is configured to provision at least one virtual network.

4. The apparatus of claim 1, wherein the baseband unit centralizes MIMO processing in a distributed antenna system.

5. The apparatus of claim 1, wherein the baseband unit is a centralized cloud-based computing system.

6. The apparatus of claim 1, wherein the antenna array comprises base transceiver stations, remote radio heads, small cells, or access points.

7. The apparatus of claim 1, wherein the baseband unit, the fronthaul network, and the antenna array are configured as a massive-MIMO system, a multi-user MIMO system, a distributed antenna system.

8. The apparatus of claim 1, wherein MIMO processing performed by the baseband unit comprises at least one of spatial diversity combining, singular value decomposition processing, spatial multiplexing, beamforming, and multi-user MIMO.

9. A method for provisioning antennas of an antenna array in a radio access network (RAN), comprising:
    configuring a baseband unit to communicate with the antenna array via a fronthaul network; and
    configuring the baseband unit to:
        for a first set of antennas in the antenna array, generate a first Multiple Input Multiple Output (MIMO) matrix from channel state information (CSI);
        compute a sparse update matrix corresponding to an update to the first set of antennas;
        sum the sparse update matrix with the first MIMO matrix to produce a second MIMO matrix corresponding to a second set of antennas in the antenna array, the second set of antennas being different from the first set of antennas;
        make a determination of which of the first MIMO matrix and the second MIMO matrix results in a better CSI, MIMO condition number, peak-to-average-power ratio, or quality metric of spatial subchannels; and
        based on the determination, configure the first set of antennas or the second set of antennas to transmit or receive signals in the RAN.

10. The method of claim 9, further comprising provisioning a virtualized baseband unit to operate as the baseband unit.

11. The method of claim 9, further comprising configuring the baseband unit to provision at least one virtual network.

12. The method of claim 9, further comprising configuring the baseband unit to centralize MIMO processing in a distributed antenna system.

13. The method of claim 9, further comprising configuring the baseband unit to employ centralized cloud-based computing.

14. The method of claim 9, wherein configuring the baseband unit to communicate with the antenna array comprises configuring the baseband unit to communicate with base transceiver stations, remote radio heads, small cells, or access points.

15. The method of claim 9, further comprising configuring the baseband unit to perform at least one of spatial diversity combining, singular value decomposition processing, spatial multiplexing, beamforming, and multi-user MIMO.

16. A non-transitory computer-readable medium storing instructions that, when executed by one or more processors, cause the one or more processors to:
    for a first set of antennas in an antenna array, generate a first Multiple Input Multiple Output (MIMO) matrix from channel state information (CSI);
    compute a sparse update matrix corresponding to an update to the first set of antennas;
    sum the sparse update matrix with the first MIMO matrix to produce a second MIMO matrix corresponding to a second set of antennas in the antenna array, the second set of antennas being different from the first set of antennas;
    make a determination of which of the first MIMO matrix and the second MIMO matrix results in a better CSI, MIMO condition number, peak-to-average-power ratio, or quality metric of spatial subchannels; and
    based on the determination, configure the first set of antennas or the second set of antennas to transmit or receive signals in a radio access network (RAN).

17. The non-transitory computer-readable medium of claim 16, further comprising instructions that, when executed by one or more processors, cause the one or more processors to communicate with the antenna array via a fronthaul network.

18. The non-transitory computer-readable medium of claim 16, further comprising instructions that, when executed by one or more processors, cause the one or more processors to centralize MIMO processing in a distributed antenna system.

19. The non-transitory computer-readable medium of claim 16, further comprising instructions that, when executed by one or more processors, cause the one or more processors to employ centralized cloud-based computing.

20. The non-transitory computer-readable medium of claim 16, further comprising instructions that, when executed by one or more processors, cause the one or more processors to perform at least one of spatial diversity combining, singular value decomposition processing, spatial multiplexing, beamforming, and multi-user MIMO.

* * * * *